United States Patent
Inoue et al.

(10) Patent No.: US 7,278,655 B2
(45) Date of Patent: *Oct. 9, 2007

(54) HEAD-PROTECTING AIRBAG

(75) Inventors: Michio Inoue, Aichi-ken (JP);
Toshinori Tanase, Aichi-ken (JP)

(73) Assignee: Toyoda Gosei Co., Ltd., Aichi-ken (JP)

(*) Notice: Subject to any disclaimer, the term of this patent is extended or adjusted under 35 U.S.C. 154(b) by 298 days.

This patent is subject to a terminal disclaimer.

(21) Appl. No.: 10/941,982

(22) Filed: Sep. 16, 2004

(65) Prior Publication Data

US 2005/0062268 A1 Mar. 24, 2005

(30) Foreign Application Priority Data

Sep. 24, 2003 (JP) .............................. 2003-332003
Mar. 24, 2004 (JP) .............................. 2004-086938
Mar. 24, 2004 (JP) .............................. 2004-086951

(51) Int. Cl.
*B60R 21/26* (2006.01)

(52) U.S. Cl. .................... 280/730.2; 280/740; 280/742

(58) Field of Classification Search ............. 280/730.2, 280/730.1, 740, 743.1, 742
See application file for complete search history.

(56) References Cited

U.S. PATENT DOCUMENTS 5,765,863 A * 6/1998 Storey et al. ............... 280/729
5,833,265 A * 11/1998 Seymour .................. 280/743.1
6,056,316 A * 5/2000 Yamaji et al. ............ 280/730.2
6,164,696 A * 12/2000 Ellerbrok et al. ........ 280/743.2
6,457,742 B1 * 10/2002 Brucker ................... 280/730.2
6,793,245 B2 * 9/2004 Luders et al. ............ 280/743.1
2002/0036402 A1 * 3/2002 Heigl et al. .............. 280/743.2
2004/0251721 A1 * 12/2004 Yoshida .................... 297/250.1
2005/0121887 A1 * 6/2005 Inoue et al. .............. 280/730.2

FOREIGN PATENT DOCUMENTS

JP        A-2003-011767          1/2003

* cited by examiner

*Primary Examiner*—Paul N. Dickson
*Assistant Examiner*—Drew J. Brown
(74) *Attorney, Agent, or Firm*—Posz Law Group, PLC

(57) ABSTRACT

A head-protecting airbag of the present invention is folded and housed in upper edges of side windows, and is deployable downward when inflation gas flows in between its vehicle's inner wall and outer wall. The airbag includes a protective portion located at side of an occupant's head. The protective portion includes a temporary joint. The joint joins the inner wall and the outer wall together, and separates the inner wall and the outer wall when an inner pressure of the protective portion rises after the protective portion completes development. The airbag of the present invention assures a swift development in an initial stage of inflation, and after completing development, so inflates as to have sufficient cushioning property.

17 Claims, 17 Drawing Sheets

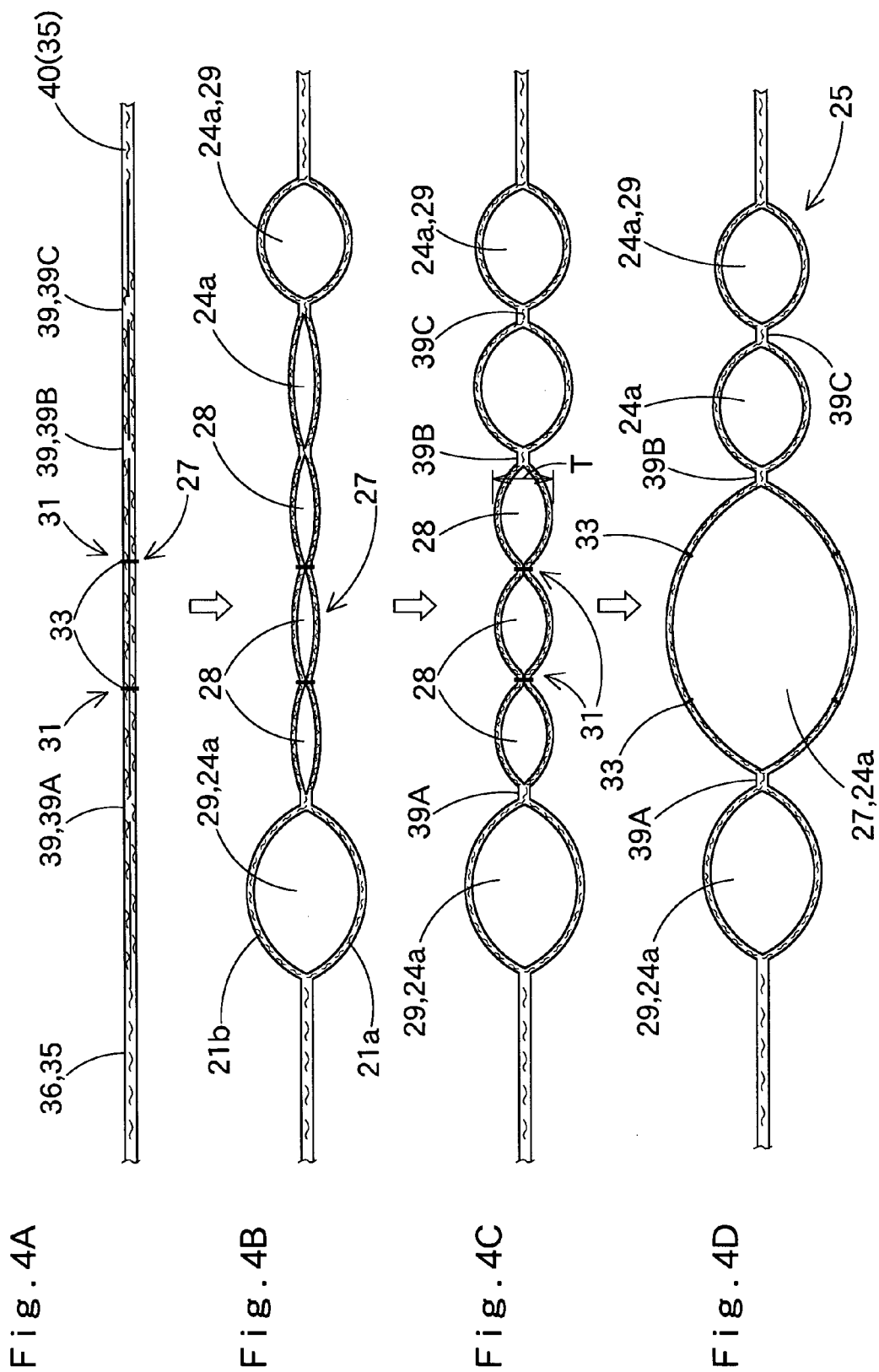

HEAD-PROTECTING AIRBAG

The present application claims priorities from Japanese Patent Application No. 2003-332003 of Inoue et al., filed on Sep. 24, 2003, Japanese Patent Application No. 2004-086938 of Inoue et al., filed on Mar. 24, 2004, and Japanese Patent Application No. 2004-086951 of Inoue et al., filed on Mar. 24, 2004, the disclosures of which are hereby incorporated into the present application by reference.

BACKGROUND OF THE INVENTION

1. Field of the Invention

The present invention relates to a head-protecting airbag which, when fed with inflation gas, is deployable downward from upper edge of side windows of a vehicle to protect an occupant's head.

2. Description of Related Art

In the prior art, Japanese Patent Laid-Open Application No. 2003-11767 is illustrative of ahead-protecting airbag which is firstly developed in a thin state and then inflates. In this airbag, a protective portion for covering an interior side of a pillar (as will be called a pillar protective portion herein after) has an inlet port of inflation gas in its lower part. Accordingly, in the initial stage of inflation, inflation gas firstly flows into left and right portions of the pillar protective portion, so that the pillar protective portion is developed in a thin state. Then after completing development, the pillar protective portion bulges by inflation gas flowing in from the inlet port in the lower part.

Although the head-protecting airbag in the prior art has no problem in developing in a thin state in the initial stage of inflation, it has a room for improvement in improving cushioning property in such portions as the pillar protective portion, i.e., in portions which desirably inflate thickly.

SUMMARY OF THE INVENTION

The present invention contemplates to solve the above-mentioned problem, and therefore, has an object to provide a head-protecting airbag capable of developing swiftly in the initial stage of inflation, and further capable of inflating so as to have sufficient cushioning property after completing development.

The head-protecting airbag according to the present invention is folded and housed in upper edges of side windows and deployable downward upon inflow of inflation gas. The airbag includes: an inflatable protective portion located at side of an occupant's head; a vehicle's inner wall and a vehicle's outer wall respectively located in the inner side and outer side of the protective portion, the walls admitting inflation gas therebetween; and a temporary joint located in the protective portion, the joint joining the inner wall and the outer wall together, and separating the inner wall and the outer wall when an inner pressure of the protective portion rises after the protective portion completes development.

In the head-protecting airbag of the present invention, since the airbag is developed with the inner and outer walls remaining joined by the temporary joint, the protective portion is swiftly developed in a thin state in the initial stage of inflation.

After the protective portion is completely developed, the temporary joint separates the vehicle's inner wall and the outer wall when the inner pressure rises. Accordingly, the protective portion inflates so thick as to have sufficient cushioning property, i.e., secure sufficient shock-absorbing stroke for protecting the occupant.

Therefore, the head-protecting airbag of the present invention is capable of developing swiftly in the initial stage of inflation, and further capable of inflating thick enough to protect an occupant effectively after completing development.

It is desired that the temporary joint includes a substantially vertical portion, and that the temporary joint separates the inner and outer walls from its lower end.

With this construction, separation of the vehicle's inner wall and outer wall in the temporary joint proceeds from lower side to upper side of the protective portion. If the inner and outer walls in the temporary joint is constructed to be separated from upper ends, an upper part of the protective portion starts to bulge before completion of development since the head-protecting airbag is constructed to develop downward from an upper side of side windows, so that access of inflation gas to a lower part of the protective portion is delayed, and quick and smooth development of the protective portion is hindered. With the above construction, however, separation of inner and outer walls starts in a condition that inflation gas has reached the lower side of the protective portion. Consequently, quick development of the protective portion is stably assured.

When the temporary joint of the head-protecting airbag includes a substantially vertical portion and separates the inner and outer walls from its lower end, it is desired that the temporary joint is located in a portion contactable with an occupant's head in the protective portion, and that the airbag is further provided at least either in front or rearward of the contactable portion with a vertical gas passage for inflation gas to flow downward therethrough. The passage helps develop the contactable portion completely before the inner and outer walls in the temporary joint start separating in the initial stage of inflow of inflation gas.

With this construction, even if an occupant's head is positioned to the exterior inside the vehicle, i.e., close to side windows, in the initial stage of inflow of inflation gas, the contactable portion of the protective portion is developed by inflation gas flowing into the vertical passage. Since the temporary joint is constructed to separate the inner and outer walls from the lower ends according as inflation gas flows in from a lower portion of the vertical passage, the temporary joint does not start separating the walls before the contactable portion completes development. Consequently, the contactable portion is developed in a thin state, and easily enters in between a narrow space between the occupant's head and side window even if the head is close to side window.

After completing development, the contactable portion starts to bulge from its lower part according as inflation gas flows in from the lower portion of the vertical passage. If then an enough tension is applied to the inner and outer walls of the contactable portion, the walls in the temporary joint are separated from each other from lower ends, so that the contactable portion results in bulging thick. Consequently, the contactable portion protects the occupant's head, which was close to the side window, in a manner to put the head back inward.

On the other hand, if the occupant's head is positioned away from side windows, the airbag smoothly completes development with inflation gas, and supplies gas to every portions of the protective portion smoothly and quickly. When the protective portion is entirely inflated, a tension is applied to the vehicle's inner and outer side walls in a separating direction, so that the walls in the temporary joint in the contactable portion smoothly and quickly separate from each other. Thus, the contactable portion which no longer has the temporary joint inflates immediately, and protects the occupant's head with enough cushioning property or impact-absorbing stroke even if the head approaches the contactable portion thereafter.

Therefore, the head-protecting airbag of the present invention protects an occupant's head effectively while adjusting its behavior in development and inflation according to a position of the head in the interior-exterior direction of the vehicle.

In this case, it is desired that inflatable portions located in front and rearwards of the temporary joint have thicknesses of 30 to 75 mm right before the inner and outer walls in the temporary joint start separating. It is because, if the thickness of each of the inflatable portions in front and rear of the temporary joint is over 75 mm right before the inner and outer walls in the temporary joint start separating, it is liable that the inflatable portions are interfered with the approaching occupant's head in the course of development, which hinders the deployment of the contactable portion. If the thickness of each of the inflatable portions right before the separation of the temporary joint is 30 mm or over, moreover, the inflatable portions do not hinder the deployment of the contactable portion in the course of development, and the contactable portion protects the occupant's head from completion of development to an instant right before the separation of the temporary joint.

In a head-protecting airbag which is capable of adjusting its behavior in development and inflation according to a position of the head in the interior-exterior direction of the vehicle, it will also be appreciated that the airbag further includes a non-admissive portion joining the inner and outer walls undetachably and admitting no inflation gas, that the non-admissive portion includes a partitioning portion for partitioning the protective portion, and that the partitioning portion includes a cover portion located upstream of inflation gas than an upper end of the temporary joint, such that the cover portion protects the upper end part of the temporary joint from inflation gas.

With this construction, the upper end part of the temporary joint is protected by the cover portion of the partitioning portion, which further assures the separation of the inner and outer walls from the lower end of the temporary joint.

Strength to separate the vehicle's inner wall and outer wall in the temporary joint is desirably within a range of 50 to 550N.

With this construction, the vehicle's inner wall and outer wall are prevented from being unexpectedly separated due to influences of heat and flow rate of inflation gas, but are stably separated after the airbag completes development, so that the airbag inflates so thick as to have sufficient shock-absorbing stroke, or cushioning property. Here, if the strength of the temporary joint is less than 50N, it is liable that the inner and outer walls in upper end of the temporary joint are separated immediately due to influences of heat and flow rate of inflation gas. This may hinder the development of the airbag in a narrow space when the occupant's head is close to side windows. On the other hand, if the strength of the temporary joint excesses 550N, it is liable that separation of the inner and outer walls in lower end of the temporary joint is delayed, so that the airbag cannot be bulged timely to cushion the head in contact therewith back inward of the vehicle. This is not desirable in light of protecting an occupant's head with sufficient cushioning property.

Especially, if it is presupposed that the vehicle's inner wall and outer wall in the temporary joint are separated from the lower end in a condition that the contactable portion is in contact with the occupant's head, the strength of the temporary joint is desirably 500N or lower, i.e., within a range of 50 to 500N, so that the inner wall and outer wall are securely separated when a tension is applied to the walls in a separating direction along with inflation of the protective portion, even if the contactable portion is in contact with the occupant's head. When it is presupposed that the inner wall and outer wall are likely to be unexpectedly separated due to influences of heat and flow rate of inflation gas depending on a position of the temporary joint, the strength of the temporary joint is desirably 150N or higher, i.e., within a range of 150 to 550N. In consideration of these circumstances, the strength of the temporary joint is desirably within a range of 150 to 500N.

When the temporary joint includes a substantially vertical portion and separates the inner and outer walls from its lower ends, if the airbag includes a non-admissive portion joining the inner and outer walls undetachably and admitting no inflation gas, it is desired that the temporary joint is either proximate, or joined at its upper end to the non-admissive portion such that stress concentration is less likely to occur in the upper end of the temporary joint than in a lower end of the temporary joint.

With this construction, the upper end of the temporary joint is likely to be free from stress concentration because of the non-admissive portion, so that the inner and outer walls are stably separated upward from the lower end.

Moreover, the upper end of the temporary joint is proximate to or joined to an upper end of the non-admissive portion. A portion encircled by the temporary joint and the non-admissive portion and inflatable after the separation of the inner and outer walls in the temporary joint has an inlet port of inflation gas in a lower part. Accordingly, a portion communicated with the portion encircled by the temporary joint and the non-admissive portion via the inlet port completes development earlier, so that the portion encircled by the temporary joint and the non-admissive portion completes development in a thin state, and is developed in a space between an occupants' head and side windows even if the space is extremely narrow.

In this case, if a gas feed passage is arranged along an upper edge of the airbag in the front-rear direction, and located upstream of inflation gas, it is desired that a portion of the protective portion which neighbors the temporary joint in the front-rear direction and is located opposite from a position where the temporary joint is proximate to or joined to the non-admissive portion is communicated at an upper part thereof with the gas feed passage.

With this construction, the portion located opposite from a position where the temporary joint is proximate to or joined to the non-admissive portion gains thickness while the airbag is developed in the initial stage of inflation of the airbag. Accordingly, the portion is capable of protecting an occupant without affecting developing performance of the airbag even before the separation of the inner wall and outer wall in the temporary joint.

When stress concentration is less likely to occur in the upper end of the temporary joint than in the lower end, if the non-admissive portion includes a partitioning portion arranged substantially vertically for partitioning the protective portion, it will also be appreciated that the temporary joint is curved toward upstream of inflation gas to become parallel with a stream of inflation gas in its upper end, and that the upper end is proximate to or joined to an upper end of the partitioning portion.

With this construction, when inflation gas flows in, the upper end of the temporary joint are not interfered with by the gas stream, so that the inner wall and outer wall in the temporary joint are stably separated from the lower end without being affected by inflation gas.

In this case, if inflation gas flows in the front-rear direction in the vicinity of the upper end of the partitioning portion, a horizontal portion of the temporary joint may be arranged at a lower level than the upper end of the partitioning portion. Thus the upper end of the temporary joint is not affected by inflation gas, so that the inner wall and outer wall in the temporary joint are stably separated from the lower end.

When stress concentration is less likely to occur in the upper end of the temporary joint than in the lower end, if the non-admissive portion includes a partitioning portion partitioning the protective portion and encircling the temporary joint from front, rear and upper sides in an inverted U shape, the upper end of the temporary joint may be proximate to or joined to an upper horizontal portion of the inverted U-shaped partitioning portion.

With this construction, the upper end of the temporary joint is protected by the horizontal portion and the front and rear vertical portions of the partitioning portion from heat and so on of inflation gas, so that the inner wall and outer wall in the temporary joint are stably separated from the lower end.

Furthermore, when stress concentration is less likely to occur in the upper end of the temporary joint than in the lower end, if the non-admissive portion includes partitioning portions arranged vertically in front and rearwards of the temporary joint for partitioning the protective portion, the temporary joint is desirably provided in its upper end with a horizontal portion to be proximate to or joined to upper ends of the partitioning portions.

With this construction, since front and rear ends of the horizontal portions of the temporary joint are proximate to or joined to the upper ends of the partitioning portion, stress is not likely to concentrate thereon. Accordingly, the inner wall and outer wall in the temporary joint are stably separated from the lower end. Moreover, if then the inner and outer walls in entire temporary joint are separated, the walls are separated in the elongate horizontal portions which had been proximate to or joined to the front and rear partitioning portions. Consequently, the airbag is further inflated thick to improve cushioning property.

If the temporary joint is formed by a breakable yarn joining the vehicle's inner wall and outer wall, the temporary joint may be formed by stitching up the inner and outer walls. Alternatively, not by stitching work, it may be formed in a hollow-weaving process of the airbag, by weaving a warp or a weft of at least either of the vehicle's inner wall or outer wall into the other side wall. Of course, the temporary joint may be formed by adhesive adhering the vehicle's inner wall and outer wall detachably.

BRIEF DESCRIPTION OF DRAWINGS

FIGS. 4A, 4B, 4C and 4D are partial cross sections orderly illustrating inflation processes of the airbag of FIG. 2, taken along line IV-IV in FIG. 2;

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
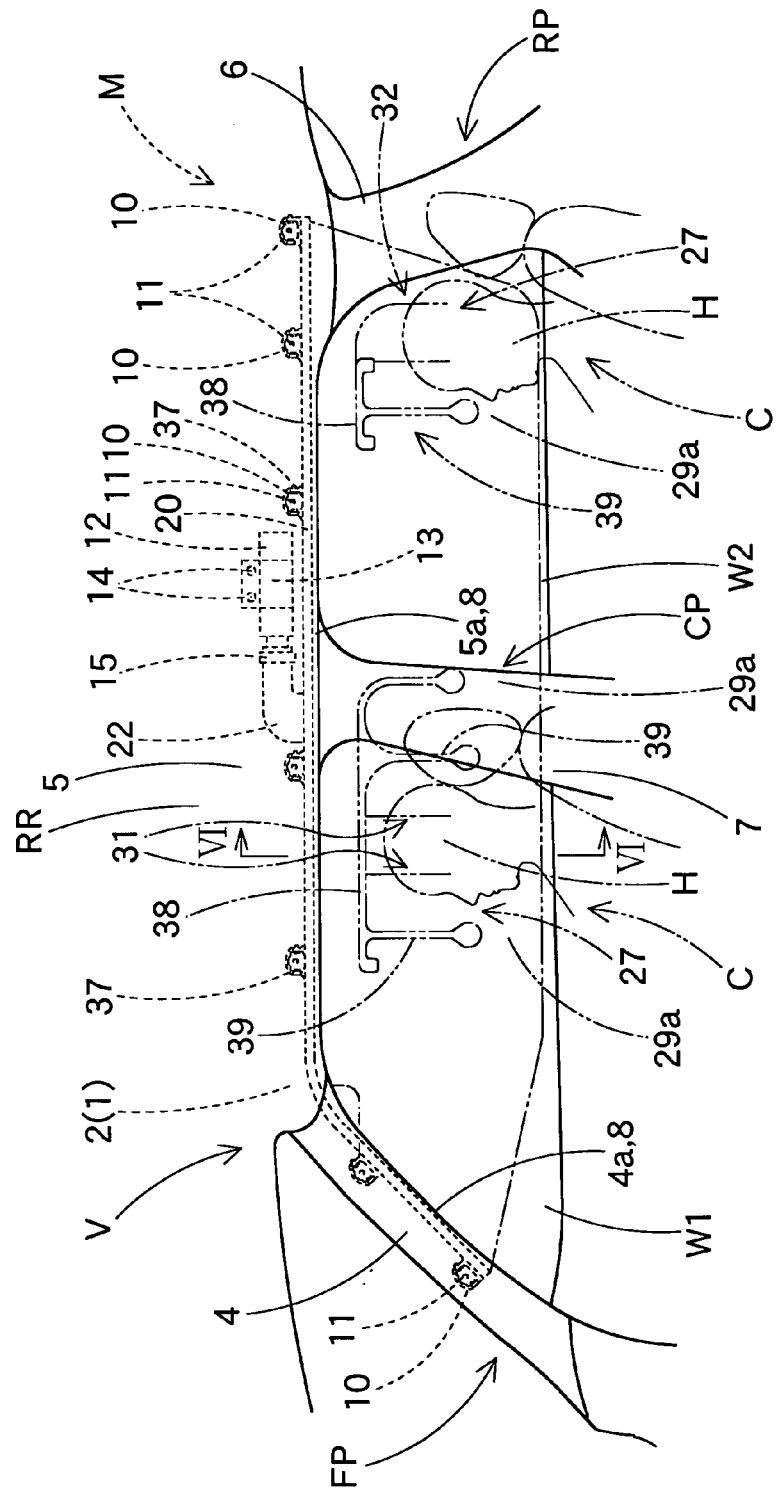
FIG. 1 is a schematic front view of a head-protecting airbag device employing an airbag according to the present invention, as mounted on a vehicle.
Figure 2:
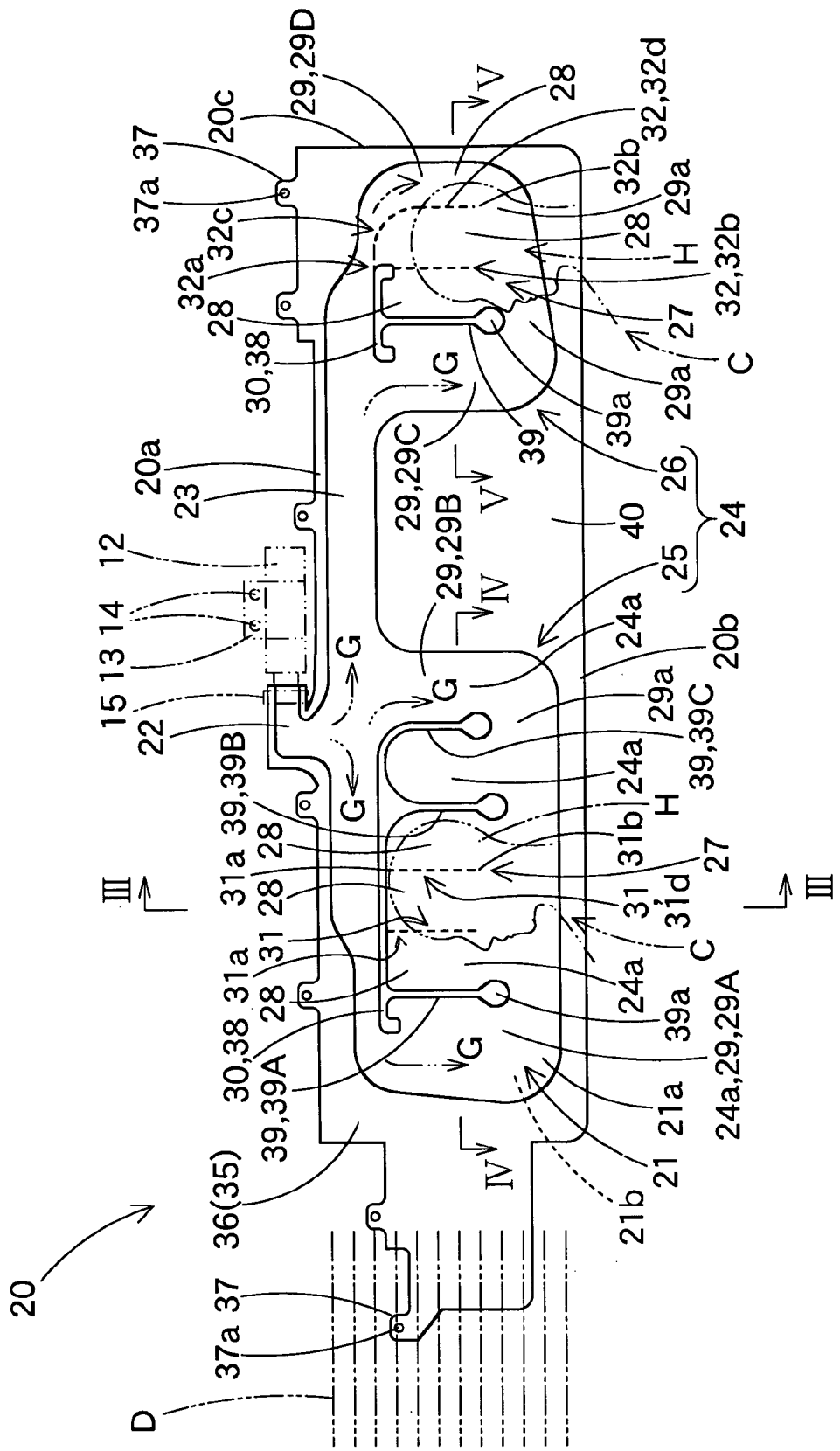
FIG. 2 is a front view of an embodiment of the airbag according to the present invention.
Figure 3:
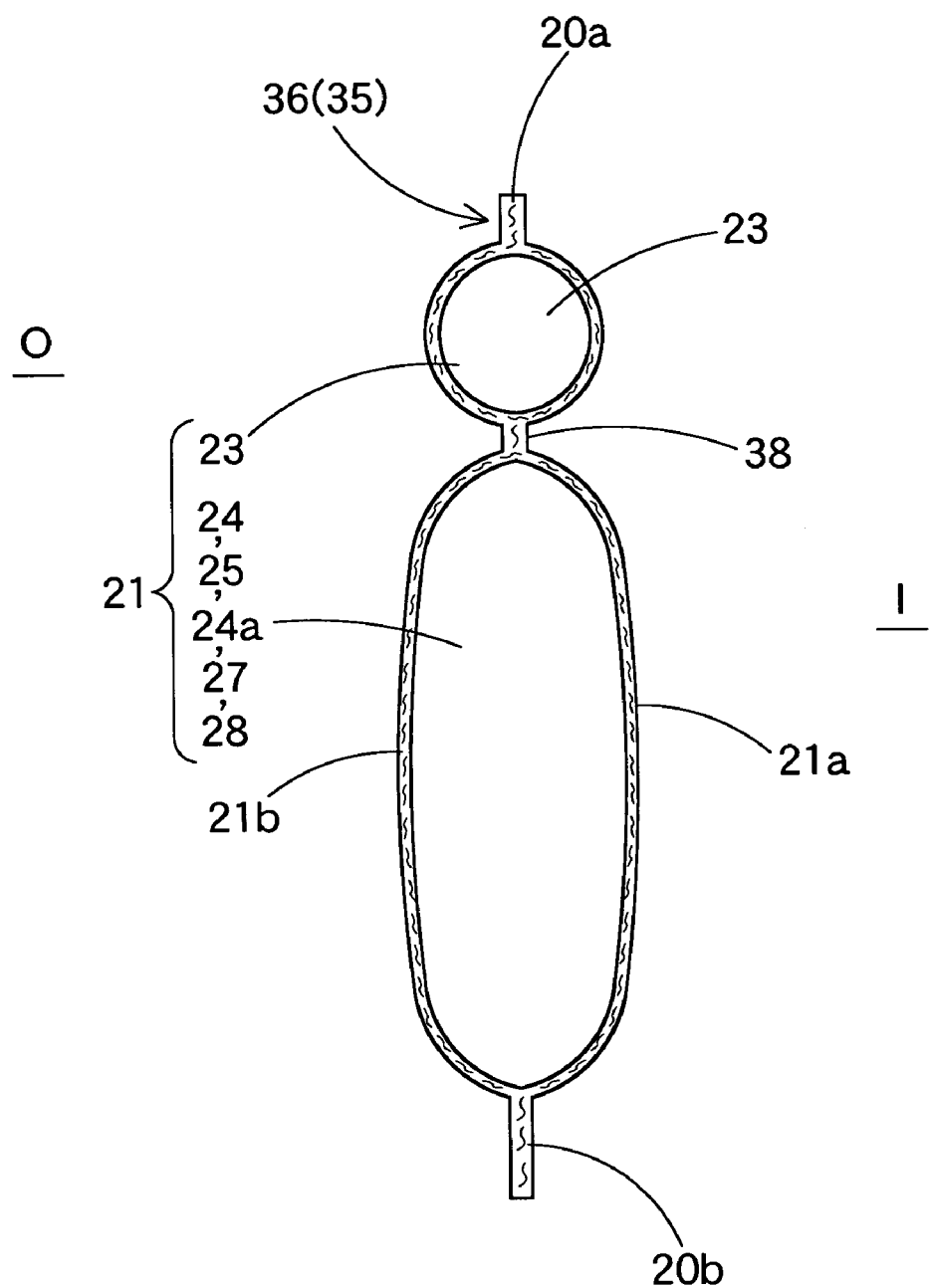
FIG. 3 is a partial vertical section of the airbag of FIG. 2, taken along line III-III in FIG. 2.

As shown in FIGS. 1 and 2, a head-protecting airbag 20 according to the present invention is employed in a head-protecting airbag device M mountable on a vehicle V. The head-protecting airbag device M includes the airbag 20, an inflator 12, mounting brackets 10 and 13, and an airbag cover 8. The airbag 20 is folded and housed along upper edge of side windows W1 and W2 inside the vehicle, in a range from lower edge part of a front pillar FP to upper part of a rear pillar RP, via lower edge part of a roof side rail RR.

As shown in FIGS. 1 and 2, the inflator 12 has a substantially cylindrical shape. The inflator 12 is sheathed with a joint port 22 of the airbag 20 for introducing inflation gas, and connected with the airbag 20 by a cramp 15. The inflator 12 is attached to an inner panel 2 by a mounting bracket 13 in the roof side rail RR above the center pillar CP while being covered by a lower edge 5a of the roof head lining 5. The inner panel 2 is a part of the vehicle body 1. The mounting bracket 13 is made of sheet metal, and is secured to the inner panel 2 by mounting bolts 14 while holding the inflator 12.

Figure 6:
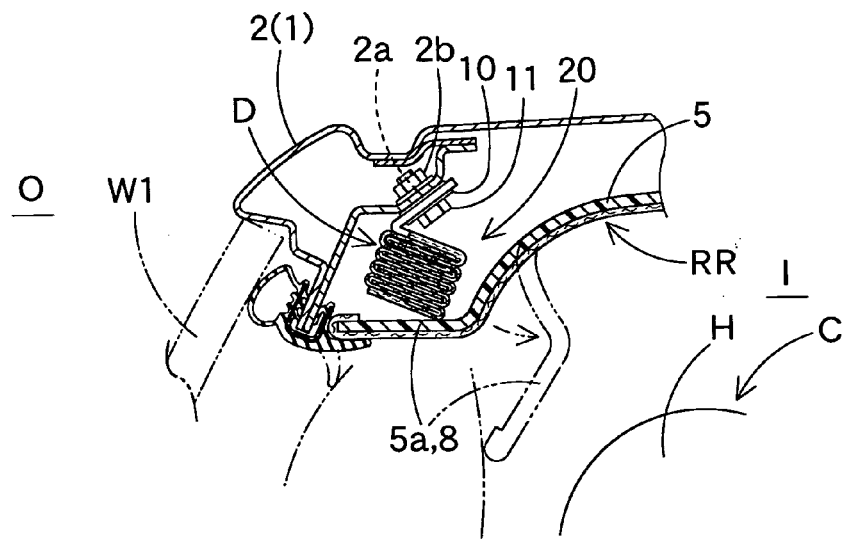
FIG. 6 schematically illustrates an inflating state of the airbag in the vicinity of a temporary joint, when an occupant is away from a side window, taken along line VI-VI in FIG. 1.
Figure 18:
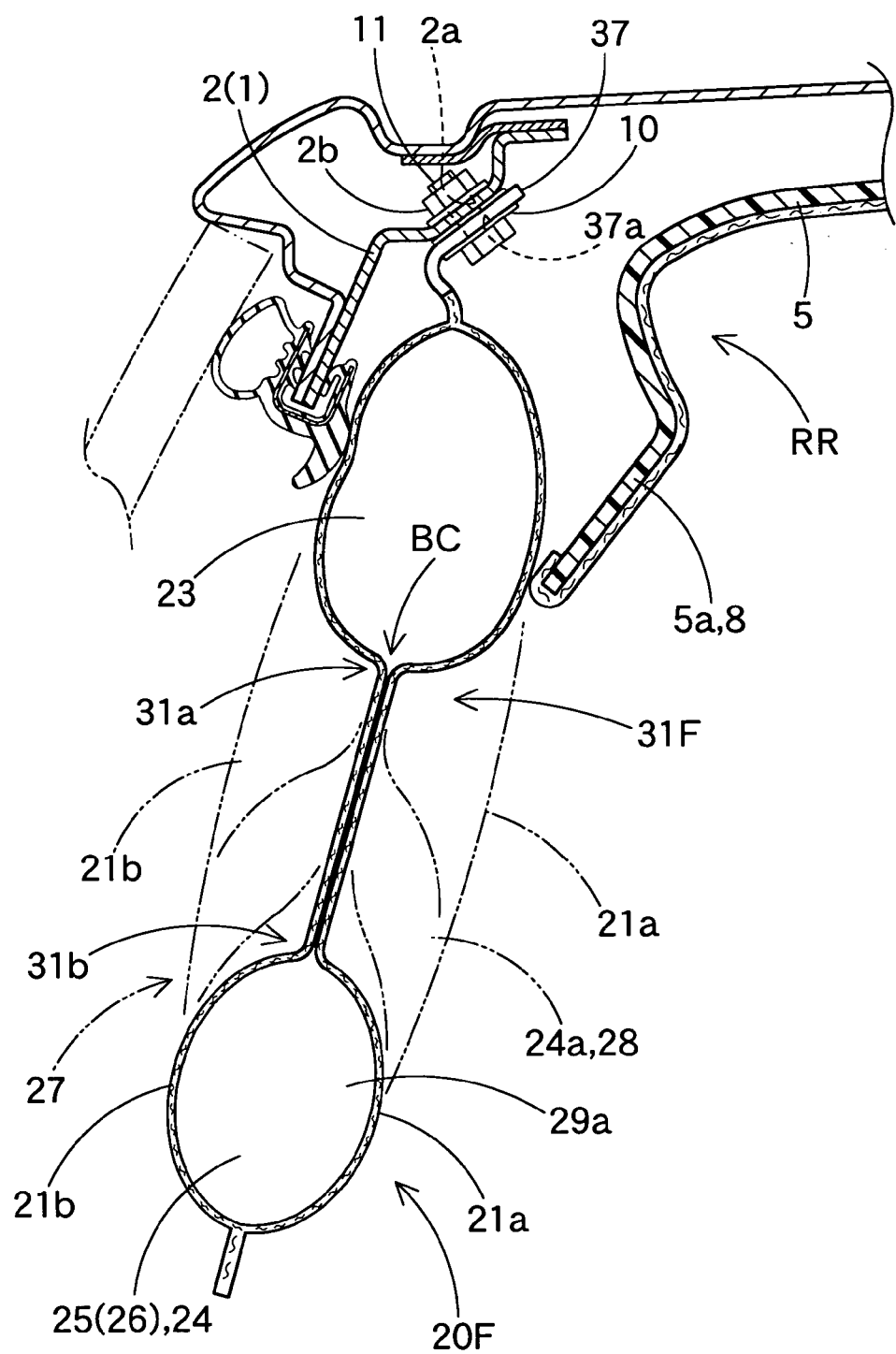
FIG. 18 is a schematic section illustrating an inflating state of still another embodiment of the airbag.

As shown in FIGS. 6 and 18, each of the mounting brackets 10 consists of two plates of sheet metal. The mounting bracket 10 is attached to a mounting portion 37 of the airbag 20 by putting the mounting portion 37 between the two plates, and secures the mounting portion 37 to the inner panel 2 by amounting bolt 11. Each of the mounting bolts 11 is fastened into a mounting hole 2a formed in the inner panel 2 and provided with a nut 2b.

The airbag cover 8 is constituted by a lower edge 4a of a pillar garnish 4 arranged in the front pillar FP and a lower edge 5a of the roof head lining 5 arranged in the roof side rail RR. The front pillar garnish 4 and the roof head lining 5 are made from synthetic resin, and are attached to vehicle's interior side of the inner panel 2 in the front pillar FP and the roof side rail RR. The roof head lining 5 is arranged from upper part of the front pillar FP to upper part of the rear pillar RP, via upper part of the center pillar CP.

As shown in FIGS. 1 to 5, the airbag 20 is made by hollow-weaving method of polyamide yarns or the like. Although the airbag 20 in the foregoing embodiment is not provided on the outer surface with silicone rubber coating or the like for preventing gas leakage which is commonly applied, a coating may be applied to prevent gas leakage. When fed with inflation gas G, the airbag 20 is developed from folded state and deploys to cover vehicle's interior side of side windows W1, W2, pillar garnishes 7 and 6 of the center pillar CP and the rear pillar RP. The airbag 20 includes a gas admissive portion 21 which admits inflation gas G inside to separate its vehicle's inner wall 21a and vehicle's outer wall 21b, and a non-admissive portion 35 which admits no inflation gas G.

The non-admissive portion 35 is formed by joining the vehicle's inner wall 21a and the vehicle's outer wall 21b of the admissive portion 21, and includes a peripheral portion 36, a plurality of mounting portions 37, partitioning portions 38 and 39, and a panel portion 40. The peripheral portion 36 is located in outer edge of the airbag 20 and encircles the gas admissive portion 21.

Each of the mounting portions 37 is projected upward from the peripheral portion 36 in the upper edge 20a of the airbag 20. The airbag 20 includes seven mounting portions 37 in the foregoing embodiment. As shown in FIGS. 6 and 18, the mounting bracket 10 is attached to each of the mounting portions 37 for attachment to the inner panel 2. Each of the mounting portions 37 is provided with a mounting hole 37a to put a bolt 11 therethrough.

The panel portion 40 has a substantially rectangular panel shape and is located between later-described front and rear protective portions 25 and 26 below a later-described gas feed passage 23. The panel portion 40 is adapted to define an entire shape of the airbag 20, and also to minimize the time to inflate the airbag 20 by reducing a volume of the gas admissive portion 21.

The partitioning portions 38 are located along the gas feed passage 23 in the front-rear direction for partitioning the gas feed passage 23 and the protective portions 25 and 26. Each one partitioning portion 38 is formed in the front protective portion 25 and the rear protective portion 26.

The partitioning portions 39 are located substantially vertically in each of the front and rear protective portions 25 and 26 to partition each of the front and rear protective portions 25 and 26 into a plurality of vertical cells 24a. Thus the partitioning portions 39 serve as thickness regulators that regulate the thickness of the completely inflated airbag 20 for inflating the airbag 20 in a flat shape. In the illustrated embodiment, in the front protective portion 25 are a partitioning portion 39A extending downward from the vicinity of the front end of the partitioning portion 38, and two partitioning portions 39B and 39C extending downward from rear part of the partitioning portion 38. The rear protective portion 26 includes a partitioning portion 39 extending downward from longitudinal center of the partitioning portion 38. The vertical cells 24a partitioned by the partitioning portions 39 and juxtaposed in the front-rear direction shorten longitudinal dimension of the airbag 20 upon deployment, so that a tension in the front-rear direction is exerted in the lower edge 20b of the airbag 20.

The gas admissive portion 21 includes a joint port 22, a gas feed passage 23 and a protective portion 24. The gas feed passage 23 is located upstream of inflation gas G than the protective portion 24, and is arranged straightly in the vehicle's front-rear direction along the upper edge 20a of the airbag 20. The gas feed passage 23 is provided in its longitudinal center with a joint port 22 extending upward for introducing inflation gas G from the inflator 12 into the gas admissive portion 21. In the gas feed passage 23, inflation gas G flowing in from the joint port 22 flows toward front and rear of the vehicle V.

The protective portion 24 is adapted to protect heads of vehicle occupants seated in the vehicle V, and includes a front protective portion 25 and a rear protective portion 26. The front protective portion 25 is arranged below a front part of the gas feed passage 23, and is located at a side of front seat of the vehicle V to cover the side window W1 located at a side of front seat upon deployment of the airbag 20. The rear protective portion 26 is arranged below a rear part of the gas feed passage 23, and is located at a side of rear seat to cover the side window W2 located at a side of rear seat. The protective portion 24 is partitioned by the partitioning portions 39 as thickness regulators into the vertical cells 24a juxtaposed in the front-rear direction of the vehicle and each of which is inflatable vertically in a rod shape. The front protective portion 25 includes four vertical cells 24a while the rear protective portion 26 includes two vertical cells 24a.

Among the vertical cells 24a, in the front protective portion 25, a cell 24a defined by the partitioning portion 38 and the front and rear partitioning portions 39A and 39B is expected to contact with and protect a head H of an occupant C in the front seat, and will be called a contactable portion 27 herein after. In the rear protective portion 26, a cell 24a between the partitioning portion 39 and the peripheral portion 36 in the rear edge 20c of the airbag 20 is a contactable portion 27 that is expected to contact with and protect a head H of an occupant C in the rear seat. There are temporary joints 31 and 32 in the contactable portions 27. The temporary joints 31 and 32 are formed by stitching yarn 33 that stitches up the vehicle's inner wall 21a and outer wall 21b. The front protective portion 25 includes two temporary joints 31 as vertical portions 31d, whose upper ends 31a are connected with the partitioning portion 38. The rear protective portion 26 includes two temporary joints 32 extending generally vertically. The front temporary joint 32 only includes a vertical portion 32d whose upper end 32a is connected with a rear end of the partitioning portion 38 and whose lower end 32b extends straightly downward. The rear temporary joint 32 is connected at its upper end 32a with the rear end of the partitioning portion 38, and curved downward as approaches its lower end 32b. In other words, the rear temporary joint 32 includes a horizontal portion 32c extending rear and downward from the rear end of the partitioning portion 38 and a vertical portion 32d extending straightly downward from the rear end of the horizontal portion 32c.

The temporary joints 31 and 32 extend straightly until the vicinity of lower ends 39a of the partitioning portions 39, and locate the lower ends 31b and 32b in halfway of the area of the protective portion 24, before reaching the peripheral portion 36. The temporary joints 31 and 32 are joined at upper ends 31a and 32a with the partitioning portion 38 as a non-admissive portion 35. With this arrangement, when a tension is applied to the walls 21a and 21b, stress is likely to concentrate on the lower ends 31b and 32b than on the upper end 31a and 32a, and accordingly, the walls 21a and 21b start to separate from each other from the lower ends 31b and 32b.

The stitching yarn 33 is not broken immediately when the contactable portions 27 inflate. Breaking strength of the yarn 33 is predetermined such that the yarn 33 is broken when, after the contactable portions 27 complete development, small cells 28 in a thin state inflate along with rise of inner pressure and a predetermined tension caused thereby is applied to the inner wall 21a and outer wall 21b of the contactable portions 27 in a separating direction.

Small cells 28 are inflatable portions split up in the front-rear direction by the temporary joints 31 and 32. Each of the small cells 28 is predetermined to have a thickness T within a range of 30 to 75 mm right before the separation of the temporary joints 31 or 32. In the foregoing embodiment, the thickness T is 50 mm.

More specifically, separating strength of the temporary joints 31 and 32 to separate the inner and outer wall 21a and 21b is predetermined to be within 50 to 550N.

In the foregoing embodiment, tensile strength and sewing pitch and so on of the stitching yarn 33 are so adjusted, when a portion of the walls 21a and 21b in a hollow-woven airbag is extracted as a sample, and a straight stitched portion is formed on the overlaid sample walls 21a and 21b by stitching yarn 33, that the stitched portion is separated at a load within 50 to 550 N when the sample walls 21a and 21b are pulled in a separating direction perpendicular to the walls 21a and 21b from their edges in an extension of the stitched portion.

In the airbag 20, the contactable portion 27 of the front protective portion 25 is provided in front and rear thereof with vertical passages 29 (29A and 29B) for allowing inflation gas G to flow downward therein in the initial stage of inflow of gas G. The vertical passages 29 help develop the contactable portion 27. The contactable portion 27 of the rear protective portion 26 is also provided in front and rear thereof with vertical passages 29 (29C and 29D) for allowing inflation gas G to flow downward therein in the initial stage of inflow of gas G. The vertical passages 29 also help complete development of the contactable portion 27. In the front protective portion 25, the vertical passage 29A is constituted by a vertical cell 24a located in front of the partitioning portion 39A and defined by the partitioning portion 39A and the peripheral portion 36. The vertical passage 29B is constituted by a vertical cell 24a located rearward of the partitioning portion 39C and between the partitioning portion 39C and the panel portion 40. In the rear protective portion 26, the vertical passage 29C is constituted by a vertical cell 24a located in front of the partitioning portion 39 and between the partitioning portion 39 and the panel portion 40. The vertical passage 29D is constituted by a small cell 28 itself located rearward of the rear temporary joint 32. The vertical passages 29 are located upstream of inflation gas G than the contactable portions 27, and introduce gas G to the contactable portions 27 from gas inlet ports 29a located in lower sides thereof. In the rear protective portion 26, since the rearmost small cell 28 equals to the vertical passage 29D, its gas inlet port 29a is formed between the lower end 32b of the rearmost temporary joint 32 and the peripheral portion 36 of the airbag lower edge 20b.

To mount the airbag 20 on the vehicle V, the airbag 20 is firstly bellows-folded, from flat expanded state, on subsequent crest and valley folds D, as shown in FIGS. 2 and 6, so that its lower edge 20b is brought closer to the upper edge 20a.

Subsequently, the folded airbag 20 is wrapped at predetermined positions with a not-shown breakable tape member for keeping the folded-up configuration. Then the inflator 12, the mounting brackets 10 and 13 are fixed thereto to form an airbag module.

By locating the individual mounting brackets 10 and 13 at predetermined positions of the inner panel 2, and fastening them into the inner panel 2 with bolts 11 and 14, the airbag module is mounted on the vehicle body 1. Thereafter, a not-shown lead wire extending from a predetermined control device for actuating the inflator is connected to the inflator 12. If the front pillar garnish 4, the roof head lining 5, and further the center pillar garnish 7 and the rear pillar garnish 6 are attached to the vehicle body 1, the head-protecting airbag device M is mounted on the vehicle V.

When the inflator 12 is actuated after the airbag device M is mounted on the vehicle V, inflation gas G discharged from the inflator 12 flows into the gas feed passage 23 from the joint port 22 and flows therein in front and rear directions, as indicated by double-dotted lines in FIG. 2. Then gas G enters each of the vertical passages 29, and the protective portion 24 of the airbag 20 is developed from folded state, and starts to inflate. The airbag 20 then breaks the tape member, pushes and opens the airbag cover 8 in the lower edges 4a and 5a of the front pillar garnish 4 and the roof headlining 5, and inflates to cover the inner side I of side windows W1 and W2, the center pillar CP, and the rear pillar RP as indicated by double-dotted lines in FIGS. 1 and 6.

Figure 7:
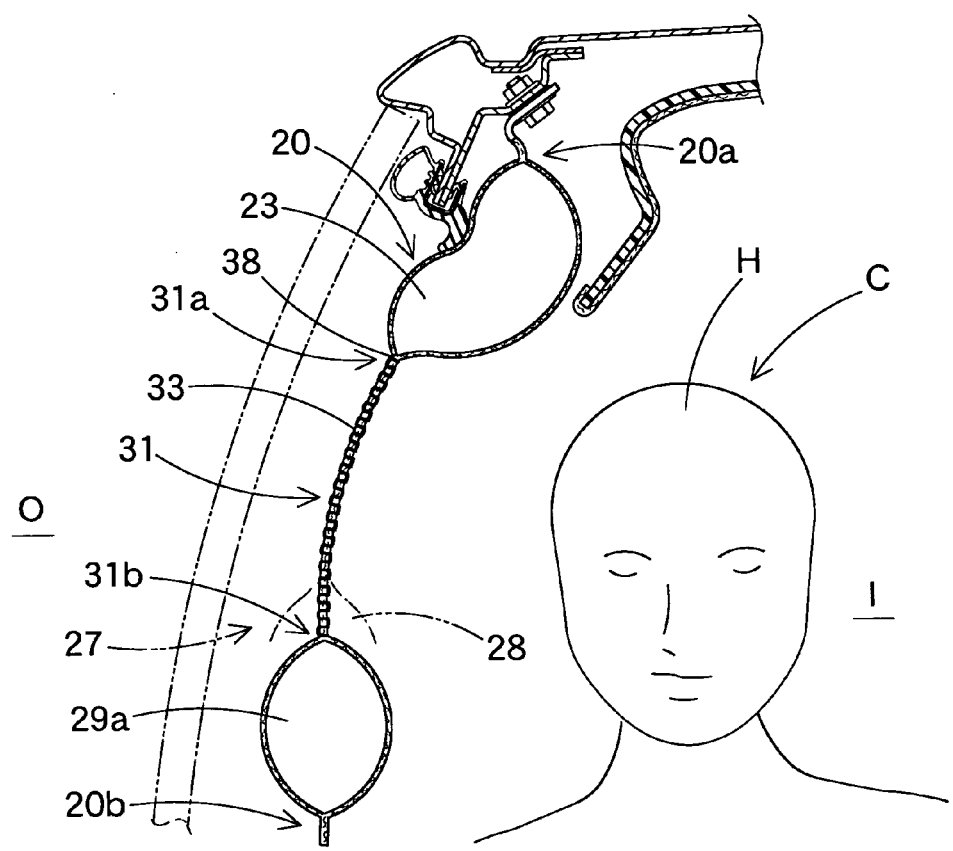
FIG. 7 schematically illustrates the inflating airbag in the vicinity of the temporary joint, following the state shown in FIG. 6.
Figure 8:
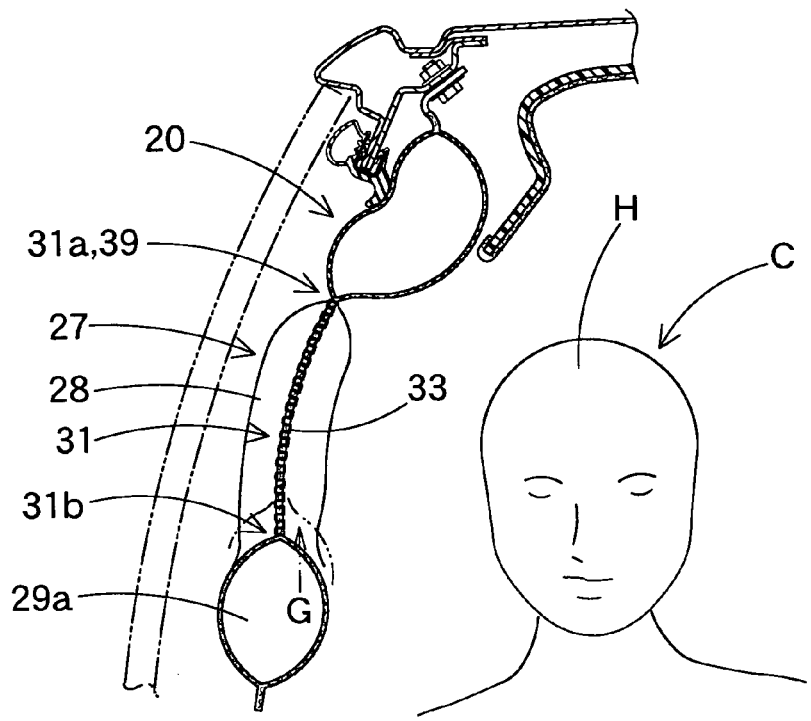
FIG. 8 schematically illustrates the inflated airbag in the vicinity of the temporary joint, following the state shown in FIG. 7.
Figure 9:
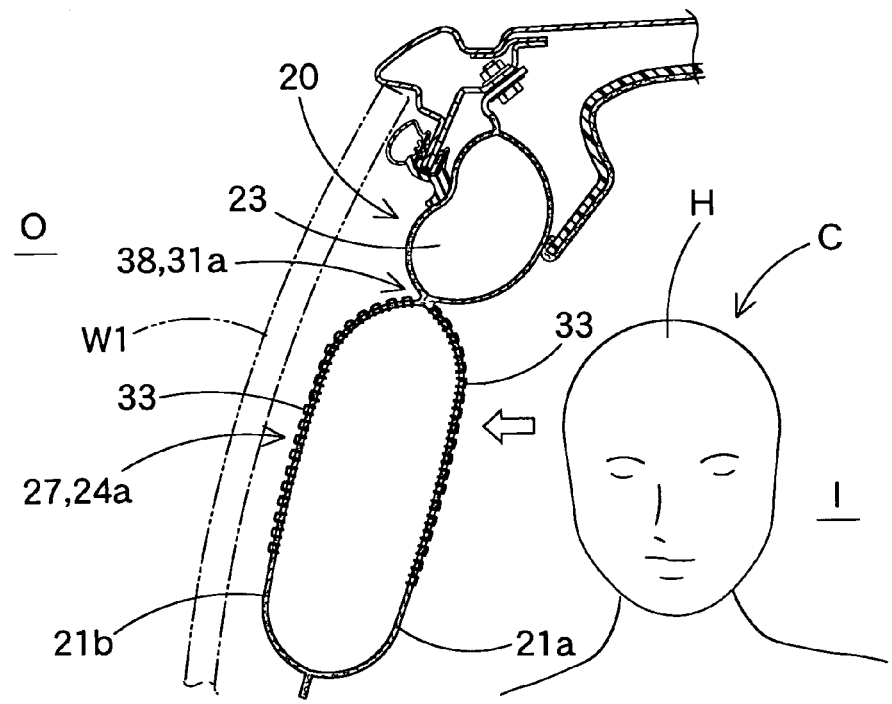
FIG. 9 schematically illustrates the inflated airbag in the vicinity of the temporary joint, following the state shown in FIG. 8.

At this time, if an occupant's head H is positioned away from side windows W1 or W2 as shown in FIGS. 6 and 7, the airbag 20 smoothly completes development with inflation gas G, and supplies gas G to every portions of the protective portion 24 smoothly and quickly. Then when the protective portion 24 is entirely inflated, a tension is applied to the vehicle's inner and outer walls 21a and 21b in a separating direction, so that the walls 21a and 21b in the temporary joints 31 and 32 in the contactable portions 27 smoothly and quickly separate from each other by breaking the stitching yarn 33 from the lower ends 31b and 32b, as shown in FIGS. 8 and 9. Thus as shown in FIGS. 4 and 5, the contactable portions 27 which no longer have the temporary joints 31 and 32 inflate immediately, and protect the occupant's head H with sufficient cushioning property or impact absorbing stroke even if the head H approaches the contactable portions 27 thereafter.

Therefore, the head-protecting airbag 20 assures a quick development in the vertical cells 24a of the contactable portions 27 in the initial stage of inflation, since the airbag 20 is developed in a condition that the inner and outer walls 21a and 21b are stitched up by the temporary joints 31 and 32, and also protects occupants with good cushioning property since the temporary joints 31 and 32 separate the walls 21a and 21b when the inner pressure rises after the airbag completes development.

Each of the temporary joints 31 and 32 includes a vertical portion 31*d* or 32*d* in the vertical cells 24*a* of the protective portion 24, and is constructed to separate the vehicle's inner wall 21*a* and outer wall 21*b* from the lower end 31*b* or 32*b*. As shown in FIGS. 7 to 9, accordingly, the temporary joints 31 and 32 of the vehicle's inner wall 21*a* and 21*b* are separated from lower side to upper side of the protective portion 24. That is, if the temporary joints 31 and 32 of the inner and outer walls 21*a* and 21*b* are constructed to be separated from the upper ends 31*a* and 32*a*, an upper part of the protective portion 24 starts to bulge before completion of development since the head-protecting airbag 20 is constructed to develop downward from an upper side of side windows W1 and W2, so that access of inflation gas G to a lower part of the protective portion 24 is delayed, and quick and smooth development of the protective portion 24 is hindered. With the above arrangement, however, separation of the temporary joints 31 and 32 of the vehicle's inner wall 21*a* and outer wall 21*b* proceeds from lower side to upper side, so that separation of inner and outer walls 21*a* and 21*b* starts in a condition that inflation gas G has reached the lower side of the protective portion 24. Consequently, quick development of the protective portion 24 is stably assured.

Figure 10A:
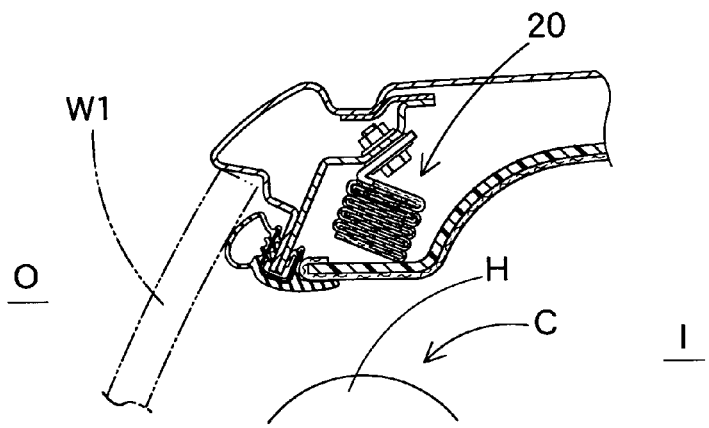
FIGS. 10A and 10B schematically illustrate inflation processes of the airbag of FIG. 2 in order in the vicinity of the temporary joint when the occupant is close to the side window.
Figure 10B:
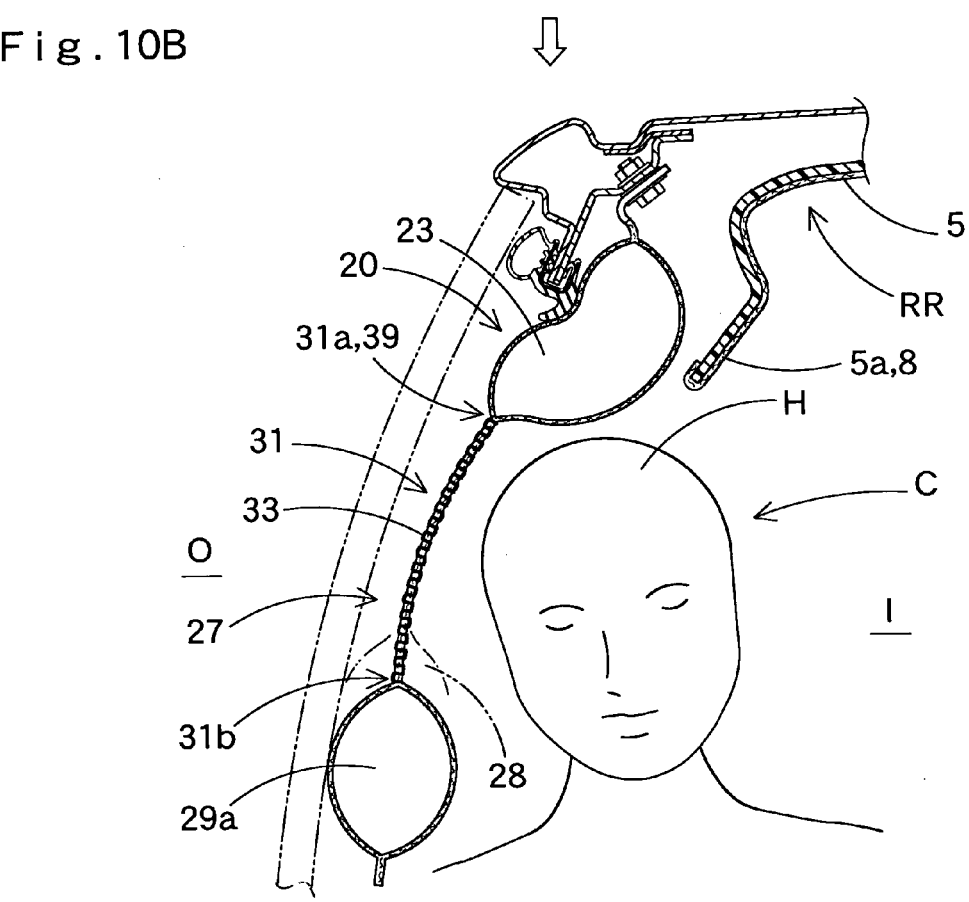

On the other hand, in the initial stage of inflow of inflation gas G, even if the occupant's head H is positioned to the exterior O inside the vehicle, i.e., close to side windows W1 or W2, as shown in FIGS. 10A and 10B, the contactable portions 27 of the protective portion 24 is developed by inflation gas G flowing into the vertical passages 29. Since the temporary joints 31 and 32 are constructed to separate the inner and outer walls 21*a* and 21*b* from the lower ends 31*b* and 32*b* according as inflation gas G flows in from the gas inlet ports 29*a* located in the lower parts of the vertical passages 29, the temporary joints 31 and 32 do not start separating the walls 21*a* and 21*b* before the contactable portions 27 complete development, as shown in FIGS. 4A, 4B, 5A and 5B. Consequently, each of the contactable portions 27 is developed in a thin state, and easily enters in between a narrow space between the occupant's head H and side window W1 or W2.

Figure 5A:
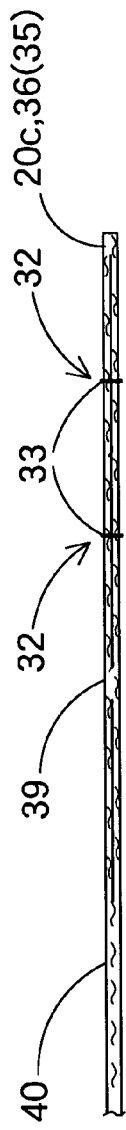
FIGS. 5A, 5B, 5C and 5D are schematic vertical sections taken along line V-V in FIG. 2.
Figure 5B:
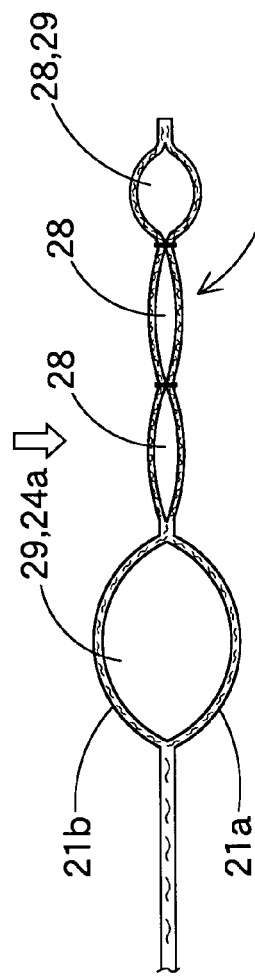
Figure 5C:
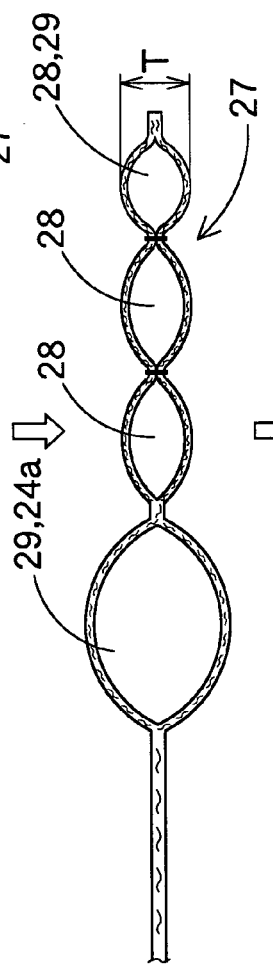
Figure 5D:
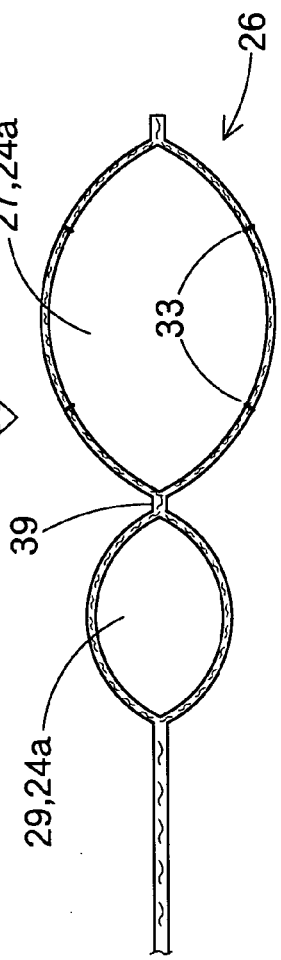
Figure 11A:
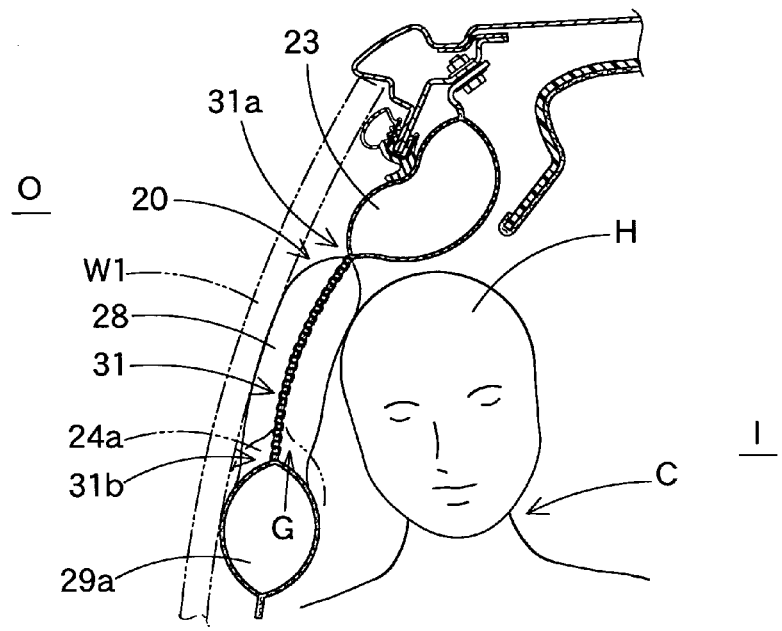
FIGS. 11A and 11B orderly illustrate the inflation processes of the airbag of FIG. 2 when the occupant is close to a side window, following the state shown in FIG. 10B.
Figure 11B:
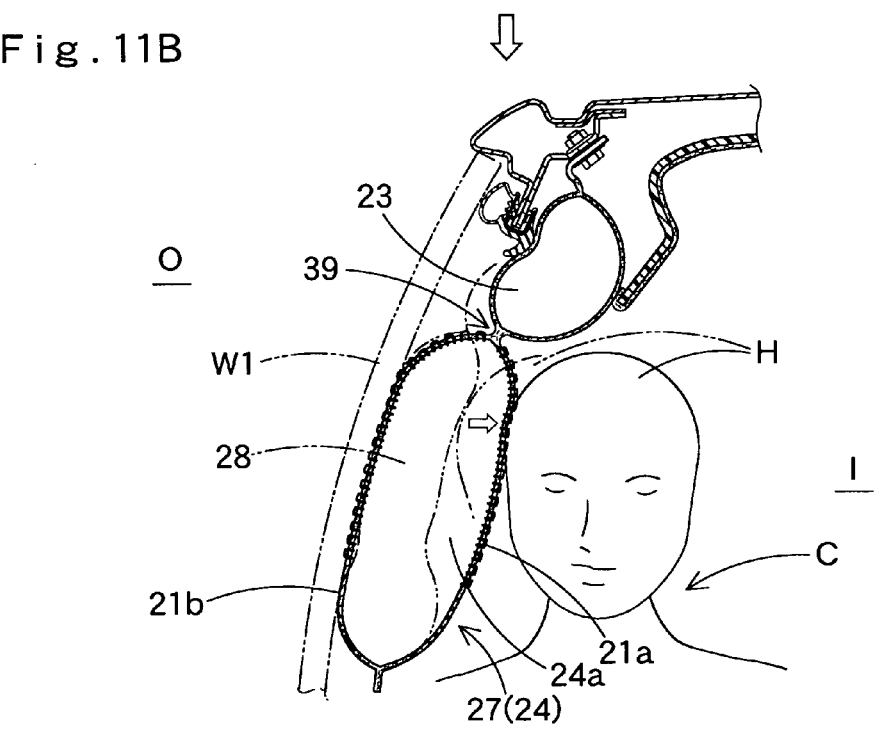

After completing development, as shown in FIG. 11A, each of the contactable portions 27 starts to bulge from lower part according as inflation gas G flows in from the gas inlet port 29*a* located in the lower part of the vertical passages 29 (refer to FIGS. 4C and 5C.) If then an enough tension is applied to the inner and outer walls 21*a* and 21*b* of the contactable portion 27, the walls 21*a* and 21*b* in the temporary joints 31 and 32 are separated from each other from the lower ends 31*b* and 32*b*, as shown in FIGS. 4D, 5D and 11B, so that the contactable portion 27 which no longer has the temporary joint 31 or 32 results in bulging thick. Consequently, each of the contactable portions 27 protects the occupant's head H located close to the side window W1 or W2, in a manner to put the head H back inward I.

Therefore, the head-protecting airbag 20 in the foregoing embodiment protects an occupant's head H effectively while adjusting its behavior in development and inflation according to a position of the head H in the interior-exterior direction of the vehicle.

In the airbag 20, moreover, the thickness of each of inflated portions in front and rearward of the temporary joints 31 and 32, i.e., the small cells 28 is predetermined to be 50 mm, within a range of 30 to 75 mm, right before the inner and outer walls 21*a* and 21*b* in the temporary joints 31 and 32 start to separate. Accordingly, the airbag 20 protects the occupant's head H without hindering the development of the contactable portions 27 before the temporary joints 31 and 32 are separated. More specifically, if the thickness T of each of the small cells 28 right before the walls 21*a* and 21*b* in the temporary joints 31 or 32 are separated is over 75 mm, it is liable that the small cells 28 are interfered with the approaching occupant's head H in the course of development, which hinders the deployment of the contactable portions 27. If the thickness T of each of the small cells 28 right before the separation of the temporary joints 31 and 32 is 30 mm or over and 75 mm or less, moreover, the small cells 28 do not hinder the deployment of the contactable portions 27 in the course of development, and the contactable portions 27 protect the occupant's head H from completion of development to an instant right before the separation of the temporary joints 31 and 32.

In the airbag 20, furthermore, separating strength of the temporary joints 31 and 32 to separate the inner and outer walls 21*a* and 21*b* is predetermined to be within 50 to 550N. Accordingly, the inner and outer walls 21*a* and 21*b* are prevented from being unexpectedly separated by influences of heat or flow rate of inflation gas G, and thus the airbag 20 stably separates the inner and outer walls 21*a* and 21*b* after complete development of the contactable portions 27, so that a sufficient shock-absorbing stroke is secured, that is, the contactable portions 27 are so inflated to have enough cushioning property. More specifically, low separating strength of the temporary joints 31 and 32 brings no problem when the occupant's head H is away from side windows W1 or W2. However, when the head H is close to side windows, the contactable portion 27 is developed close to the head H. In that case, if the separating strength of the temporary joints 31 and 32 is less than 50N, it is liable that the inner and outer walls 21*a* and 21*b* in upper ends 31*a* and 32*a* of the temporary joints 31 and 32 are separated immediately because of influences of heat and flow rate of inflation gas G. Then upper parts of the contactable portions 27 bulge, which hinders the development of the contactable portions 27. On the other hand, if the separating strength of the temporary joints 31 and 32 excesses 550N, it is liable that separation of the inner and outer walls 21*a* and 21*b* in lower ends 31*a* and 32*a* of the temporary joints 31 and 32 is delayed, so that the contactable portions 27 cannot be bulged timely to cushion the head H in contact therewith back inward I of the vehicle. This is not desirable in light of protecting an occupant's head moving outward O.

In the airbag 20, it is presupposed that the vehicle's inner wall 21*a* and outer wall 21*b* in the temporary joints 31 and 32 are separated from the lower ends 31*b* and 32*b* in a condition that the contactable portion 27 is in contact with the occupant's head H. In this case, the strength of the temporary joints 31 and 32 is desirably 500N or lower, i.e., within a range of 50 to 500N, so that the inner wall 21*a* and outer wall 21*b* are securely separated when a tension is applied to the walls 21*a* and 21*b* in a separating direction along with inflation of the protective portion 24, even if the contactable portion 27 is in contact with the occupant's head H. When it is presupposed that the inner wall 21*a* and outer wall 21*b* are likely to be inadvertently separated because of influences of heat and flow rate of inflation gas G depending on positions of the temporary joints 31 and 32 and so on, the strength of the temporary joints 31 and 32 is desirably 150N or higher, i.e., within a range of 150 to 550N. In consideration of these circumstances, the strength of the temporary joints 31 and 32 is desirably within a range of 150 to 500N.

Moreover, the airbag 20 is provided with the partitioning portions 38 that partition, as the non-admissive portion 35, the gas feed passage 23 and the protective portions 25 and 26 in the protective portion 24. The partitioning portions 38 are located upstream of inflation gas G than the upper ends 31a and 32a of the temporary joints 31 and 32, and thus serve as cover portions 30 for protecting the upper ends 31a and 32a of the temporary joints 31 and 32 from inflation gas G which has just flown in. Accordingly, the upper ends 31a and 32a of the temporary joints 31 and 32 are protected from gas G by the partitioning portions 38 or the cover portions 30, so that the inner wall 21a and outer wall 21b in the temporary joints 31 and 32 are securely separated from the lower ends 31b and 32b. Especially in the temporary joints 31, since the partitioning portion 38 completely covers over the upper ends 31a in a direction perpendicular to the vertical portions 31c, the upper ends 31a are even more protected.

Furthermore, in the front protective portion 25 of the airbag 20, the partitioning portions 38, 39A and 39B joining the inner wall 21a and outer wall 21b encircle the temporary joints 31 from front, rear and upper sides in an inverted U shape. The upper ends 31a of the temporary joints 31 vertically arranged are proximate to or joined to a horizontal portion of the partitioning portion 38. In other words, in the airbag 20, the horizontal portions 38 and front and rear vertical portions 39A and 39B as the non-admissive portion 35 prevent inflation gas G that has just flown in the airbag 20 from affecting the upper ends 31a of the temporary joints 31, so that the inner wall 21a and the outer wall 21b in the temporary joints 31 are stably separated from the lower ends 31b.

In the airbag 20, since an upper side of the contactable portion 27 of the front protective portion 25 is blocked by the partitioning portion 38, inflation gas G flows in the contactable portion 27 only from the inlet ports 29a located in front and rear. Accordingly, the contactable portion 27 remains thin when being developed, and then the small cells 28 inflate swiftly since gas G flows in from the two inlet ports 29a located in front and rear.

In the airbag 20, moreover, the small cells 28 are juxtaposed in the front-rear direction in the contactable portions 27 by the vertical temporary joints 31 and 32 juxtaposed in the front-rear direction. When the small cells 28 are united upon separation of the temporary joints 31 and 32, the contactable portions 27 gain thickness, and therefore, secure sufficient cushioning property or shock-absorbing stroke for protecting occupants' heads H.

Figure 12:
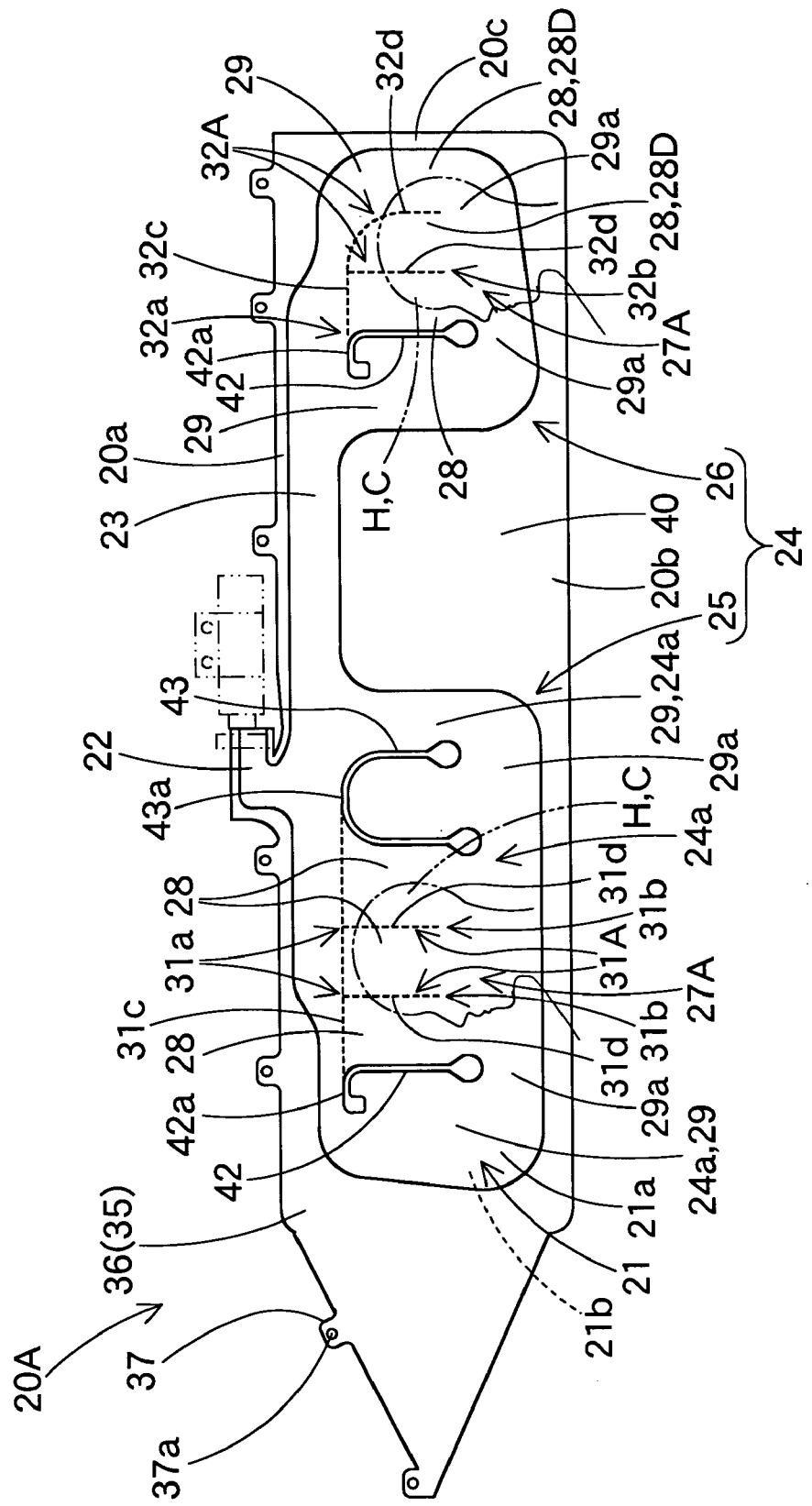
FIG. 12 is a front view of another embodiment of the airbag.

To ensure a certain thickness of the contactable portion when inflated, the airbag may be constructed as a head-protecting airbag 20A shown in FIG. 12. The airbag 20A includes partitioning portions shorter than the partitioning portions 38 in the protective portions 25 and 26 of the airbag 20. A front protective portion 25 of the airbag 20A includes two temporary joints 31A each provided with a vertical portion 31d. Upper ends of the vertical portions 31d are joined with a single horizontal portion 31c shared by each of the temporary joints 31A. The horizontal portion 31c extends perpendicularly to the vertical portions 31d, and its front and rear ends are joined with upper ends 42a and 43a of partitioning portions 42 and 43. The partitioning portions 42 and 43 each having an inverted J or U shape serve as thickness regulators, and are located to partition the protective portions 25 and 26 into a plurality of vertical cells 24a along the front-rear direction. The horizontal portion 31c is arranged along a lower edge of a gas feed passage 23. A portion 27A in the protective portion 25 contactable with an occupant's head H is defined by the horizontal portion 31c, the partitioning portions 42 and 43. The protective portion 26 includes a partitioning portion 42 and two temporary joints 32A having a horizontal portion 32c in common and joined to upper ends 42a of the partitioning portion 42.

In the front protective portion 25 of the airbag 20A thus constructed, front and rear ends of the horizontal portion 31c are joined with the upper ends 42a and 43a of the front and rear partitioning portions 42 and 43. Accordingly, stress is not likely to concentrate on the upper ends 31a of the temporary joints 31A in the initial stage of inflation, so that the inner and outer walls 21a and 21b in the temporary joint 31A are stably separated from the lower ends 31b. If then the inner and outer walls 21a and 21b in entire temporary joint 31A including the horizontal portion 31c are separated upon inflow of inflation gas G from inlet ports 29a of front and rear vertical passages 29, the contactable portion 27A are united with the gas feed passage 23 and inflated thick, so that an improved cushioning property is attained.

Figure 13:
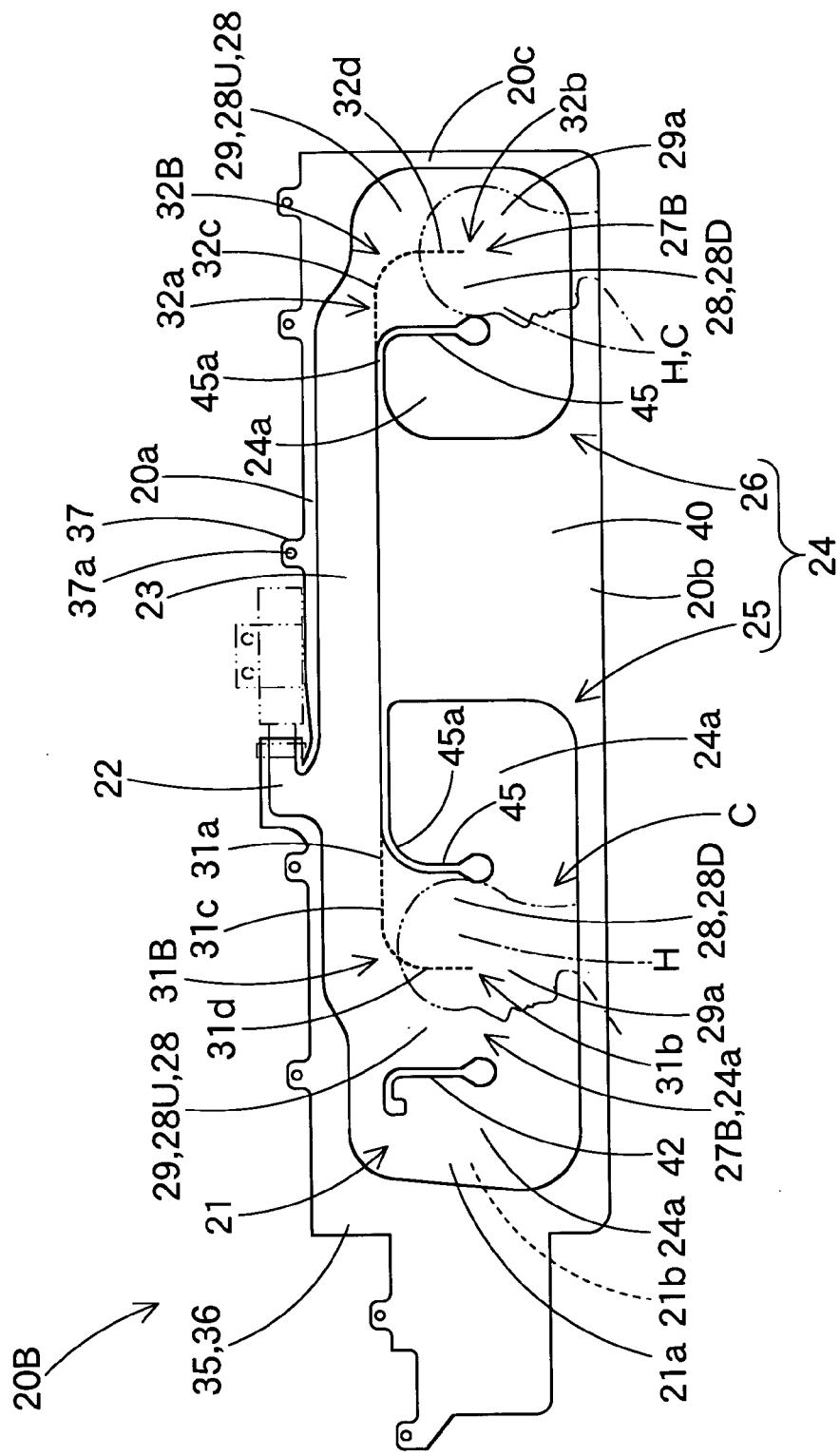
FIG. 13 is a front view of yet another embodiment of the airbag.

In order to prevent stress concentration on upper ends of a temporary joint in the contactable portion, the airbag may be constructed as a head-protecting airbag 20B shown in FIG. 13. The airbag 20B includes temporary joints 31B and 32B in each of contactable portions 27B in protective portions 25 and 26. Each of the temporary joints 31B and 32B has an inverted-L shape, and its horizontal portion 31c is joined at upper end 31a with an upper end 45a of a partitioning portion 45 being the non-admissive portion 35. Each of the partitioning portions 45 in the protective portions 25 and 26 serve as thickness regulators, and is joined at its upper end 45a to an upper end of a panel portion 40 for partitioning the gas feed passage 23 and the protective portion 25 or 26.

In the front protective portion 25 of the airbag 20B, a portion 27B contactable with an occupant's head H is defined by a partitioning portion 42 and the partitioning portion 45. Among small cells 28 (28U and 28D) located front and rearwards of the temporary joint 31B, the front cell 28U is located upstream of inflation gas G than the cell 28D, and serves as a vertical passage 29. In the rear protective portion 26, the contactable portion 27B is defined by the partitioning portion 45 and an airbag rear edge 20c. Among small cells 28 (28U and 28D) located front and rearwards of the temporary joint 32B, the rear cell 28U is located upstream of inflation gas G than the cell 28D, and serves as a vertical passage 29.

In the contactable portions 27B of the airbag 20B, too, the vertical passages 29 fed with inflation gas G help complete development, and then gas G flows into the small cells 28D from inlet ports 29a located in lower parts of the small cells 28U in upstream to inflate the small cells 28U and 28D. Since the upper ends 31a of the temporary joints 31B and 32B are joined to the partitioning portions 45 being the non-admissive portion 35, and since the lower ends 31b extend straight and end halfway in the range of the protective portions 25 and 26 before reaching peripheral portion 36, stress concentration on the upper ends 31a and 32a are suppressed, so that the inner wall 21a and outer wall 21b are stably separated from the lower ends 31b and 32b, on which stress is likely to concentrate.

Figure 14:
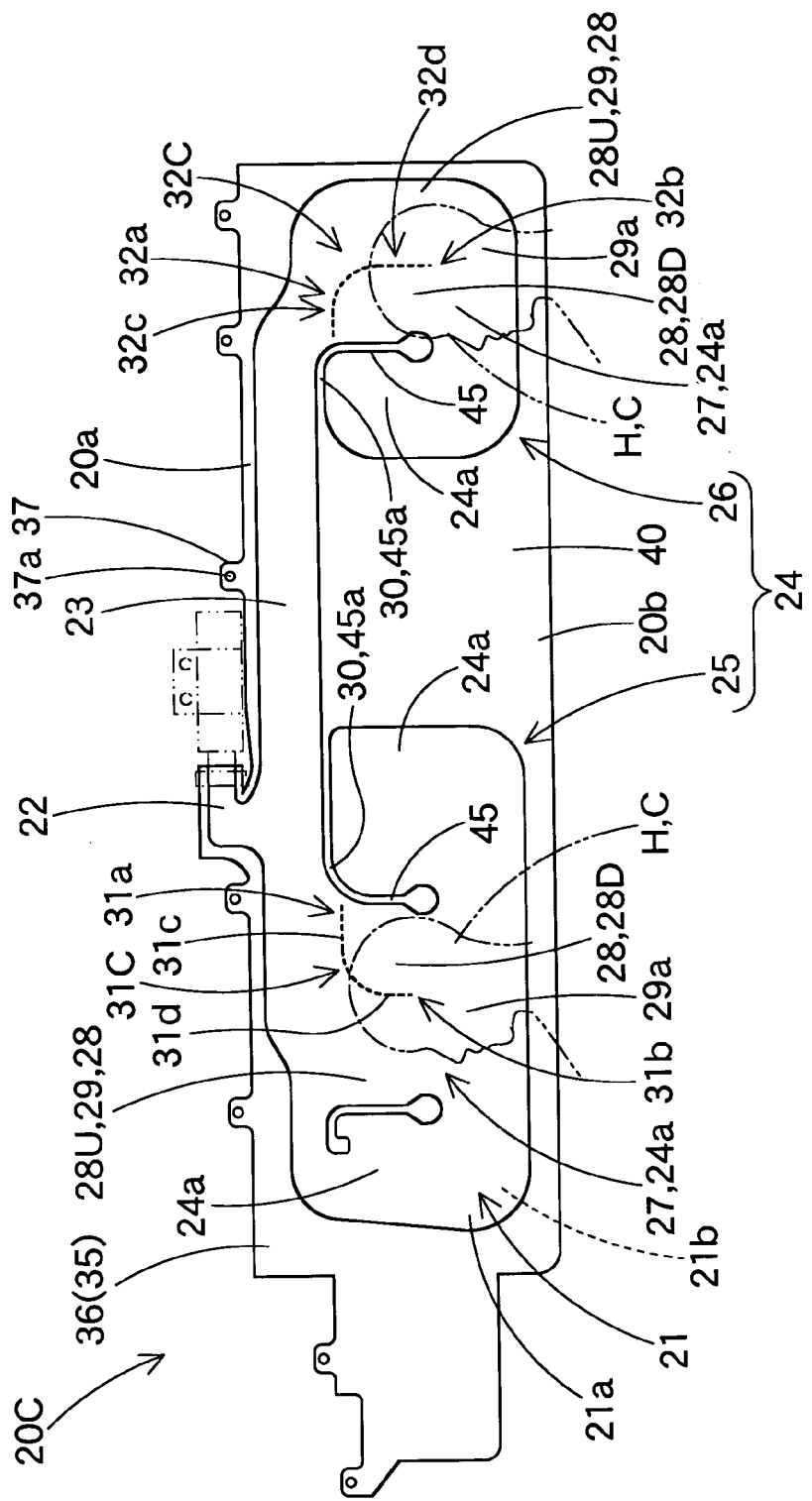
FIG. 14 is a front view of still another embodiment of the airbag.

If stress concentration is likely to occur on lower ends of temporary joints than on upper ends, the upper ends 31a and 32a may be proximate to upper ends 45a of a partitioning portion 45, and slightly apart from the upper ends 45a as in an airbag 20C shown in FIG. 14. In this case, too, the inner wall 21a and outer wall 21b are separated from lower ends of the temporary joints 31C and 32C.

In the airbags 20B and 20C, upper ends 31a and 32a of the temporary joints 31B, 31C, 32B and 32C are proximate to or joined to upper ends 45a of the vertically arranged partitioning portions 45. Portions encircled by the temporary joints 31B, 31C, 32B and 32C and the partitioning portions 45 or the small cells 28D have inlet ports 29*a* of inflation gas G in lower parts, and inflate after the inner wall 21*a* and outer wall 21*b* in the temporary joints 31B, 31C, 32B and 32C are separated. Accordingly, portions 28U communicated with the small cells 28D via the inlet ports 29*a* complete development prior to the cells 28D, so that the small cells 28D complete development in a thin state, which allows the cells 28D to develop in a space between occupants' heads and side windows W1 and W2, even if the space is extremely narrow.

Moreover, each of the airbags 20B and 20C is provided along its upper edge 20*a* with the gas feed passage 23, which is located upstream of inflation gas G. The portion 28U which neighbors the temporary joint 31B, 31C, 32B or 32C in the protective portion 24, and is located opposite from a position where the temporary joint 31B, 31C, 32B or 32C is proximate to or joined to the partitioning portion 45 is communicated at upper part with the gas feed passage 23. With this construction, each of the small cells 28U gains thickness while the airbag 20B or 20C is developed in the initial stage of inflation of the airbag 20B or 20C. Accordingly, the portions 28U are capable of protecting an occupant without affecting developing performance of the airbag 20B or 20C even before separation of the inner wall 21*a* and outer wall 21*b* in the temporary joints 31B, 31C, 32B and 32C.

In each of the airbags 20B or 20C, furthermore, the partitioning portions 45 for partitioning the protective portion 24 are arranged vertically. The horizontal portions 31*c* and 32*c* of the temporary joints 31B, 31C, 32B and 32C are curved toward upstream of inflation gas G (or the joint port 22) and become parallel with a stream of gas G, and the upper ends 31*a* and 32*a* are proximate to or joined to the upper ends 45*a* of the partitioning portion 45. With this construction, when inflation gas G flows in, the horizontal portions 31*c* and 32*c* in the upper ends 31*a* and 32*a* are not interfered with by the stream of gas G, so that the inner wall 21*a* and outer wall 21*b* in the temporary joints 31B, 31C, 32B and 32C are stably separated from the lower ends 31*b* and 32*b* without being affected by inflation gas G.

Especially in the airbag 20C, the upper ends 31*a* and 32*a* of the temporary joints 31C and 32C are located in slightly lower level than the upper end 45*a* of the partitioning portion 45, so that inflation gas G flowing in the front-rear direction does not easily interfere with the upper ends 31*a* and 32*a* of the temporary joints 31C and 32C, and stress concentration does not easily occur. Therefore, the inner wall 21*a* and outer wall 21*b* are even more stably separated from the lower ends 31*b* and 32*b*.

Figure 15:
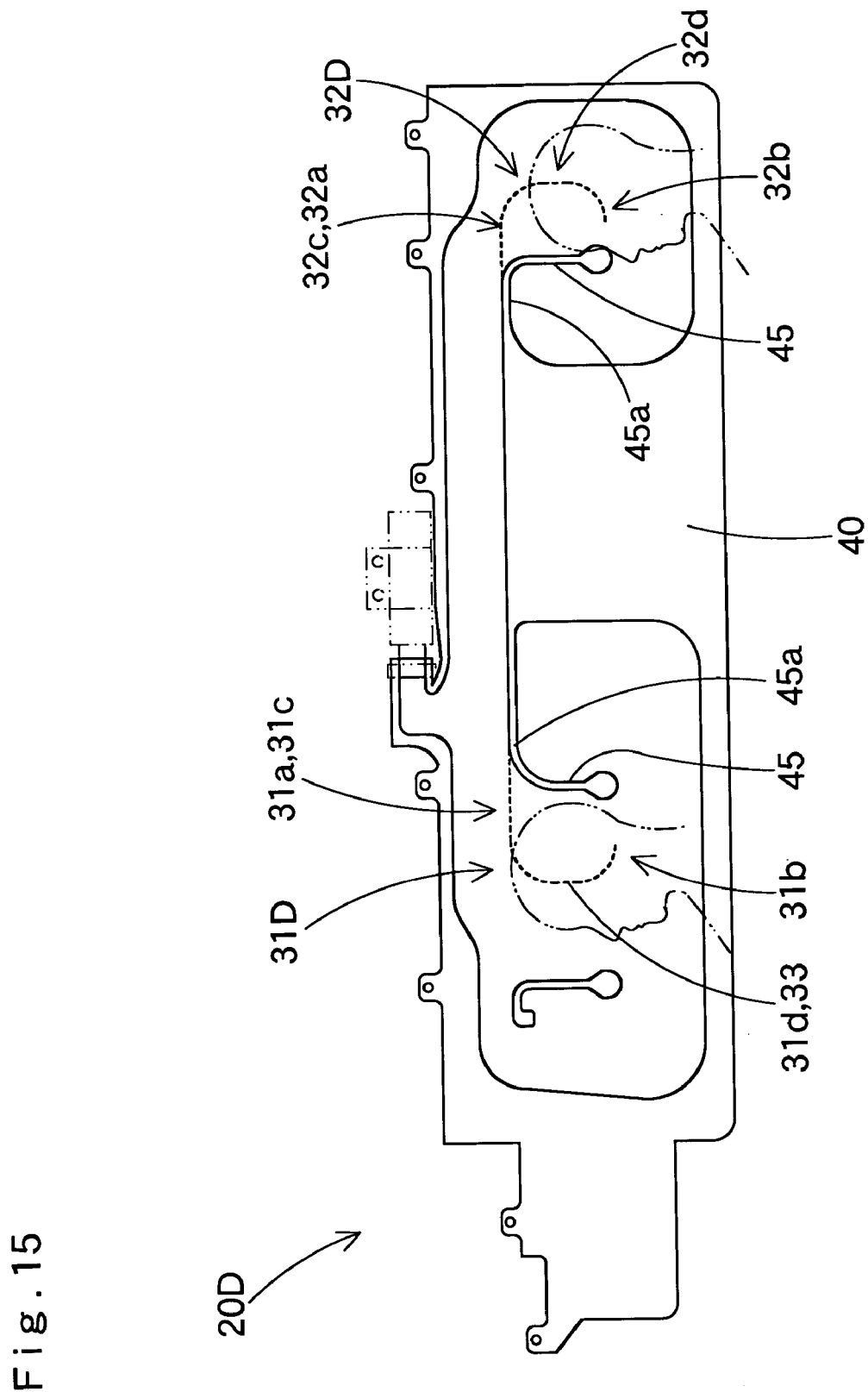
FIG. 15 is a front view of still another embodiment of the airbag.

In the foregoing airbags 20, 20A, 20B and 20C, in order that stress is more likely to concentrate on the lower ends 31*b* and 32*b* of the temporary joints 31, 31A, 31B, 31C, 32, 32A, 32B and 32C, the lower ends 31*b* and 32*b* extend straightly and end above and away from the airbag lower edge 20*b* or the peripheral portion 36 as a non-admissive portion 35. However, as in an airbag 20D shown in FIG. 15, lower-ends 31*b* and 32*b* of temporary joints 31D and 32D may be curved so that strength of stitching yarn 33 is improved, and a timing of separation of the inner wall 21*a* and outer wall 21*b* from the lower ends 31*b* and 32*b* of the temporary joints 31D and 32D is slightly delayed.

Figure 16:
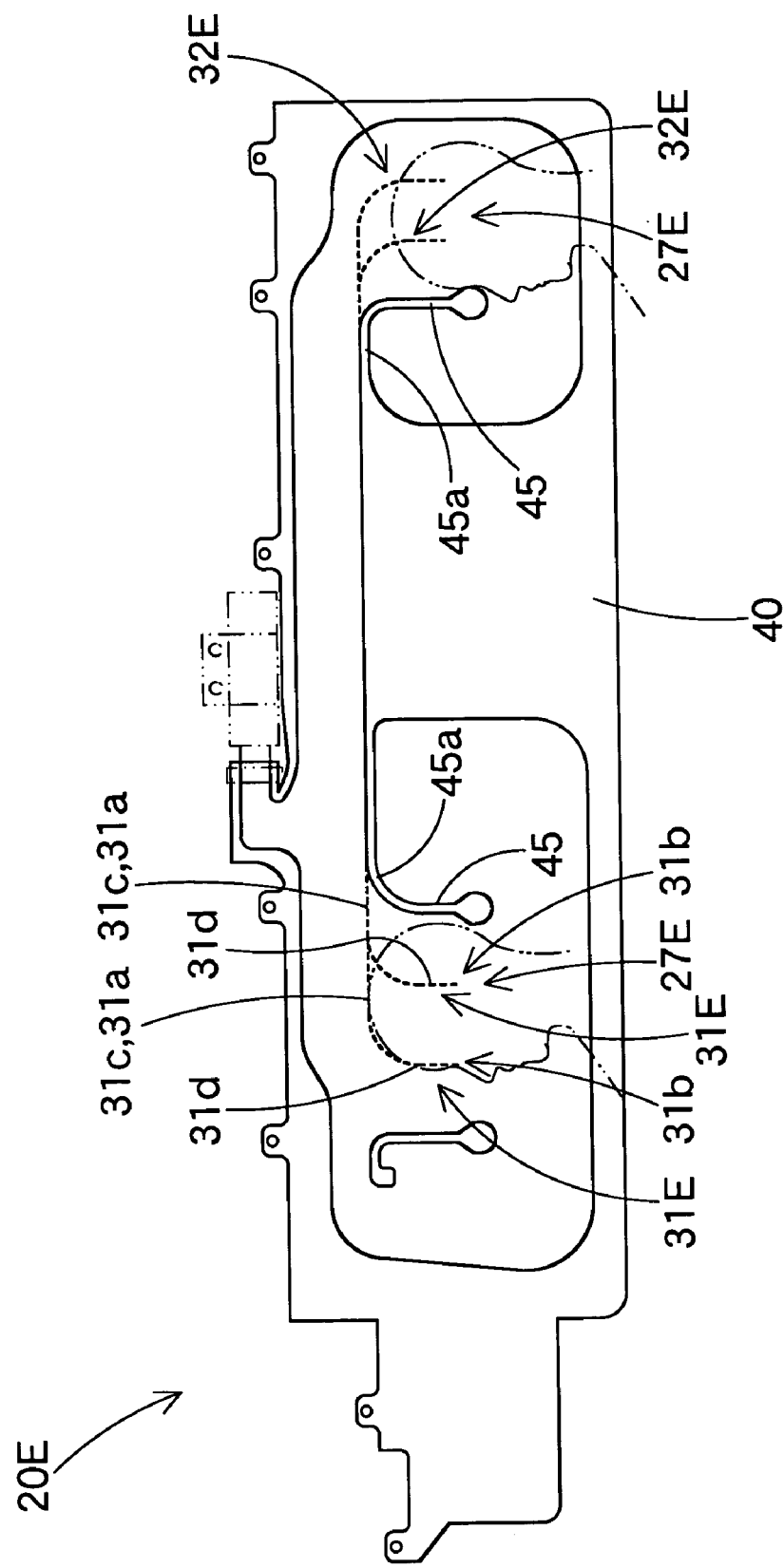
FIG. 16 is a front view of still another embodiment of the airbag.
Figure 17:
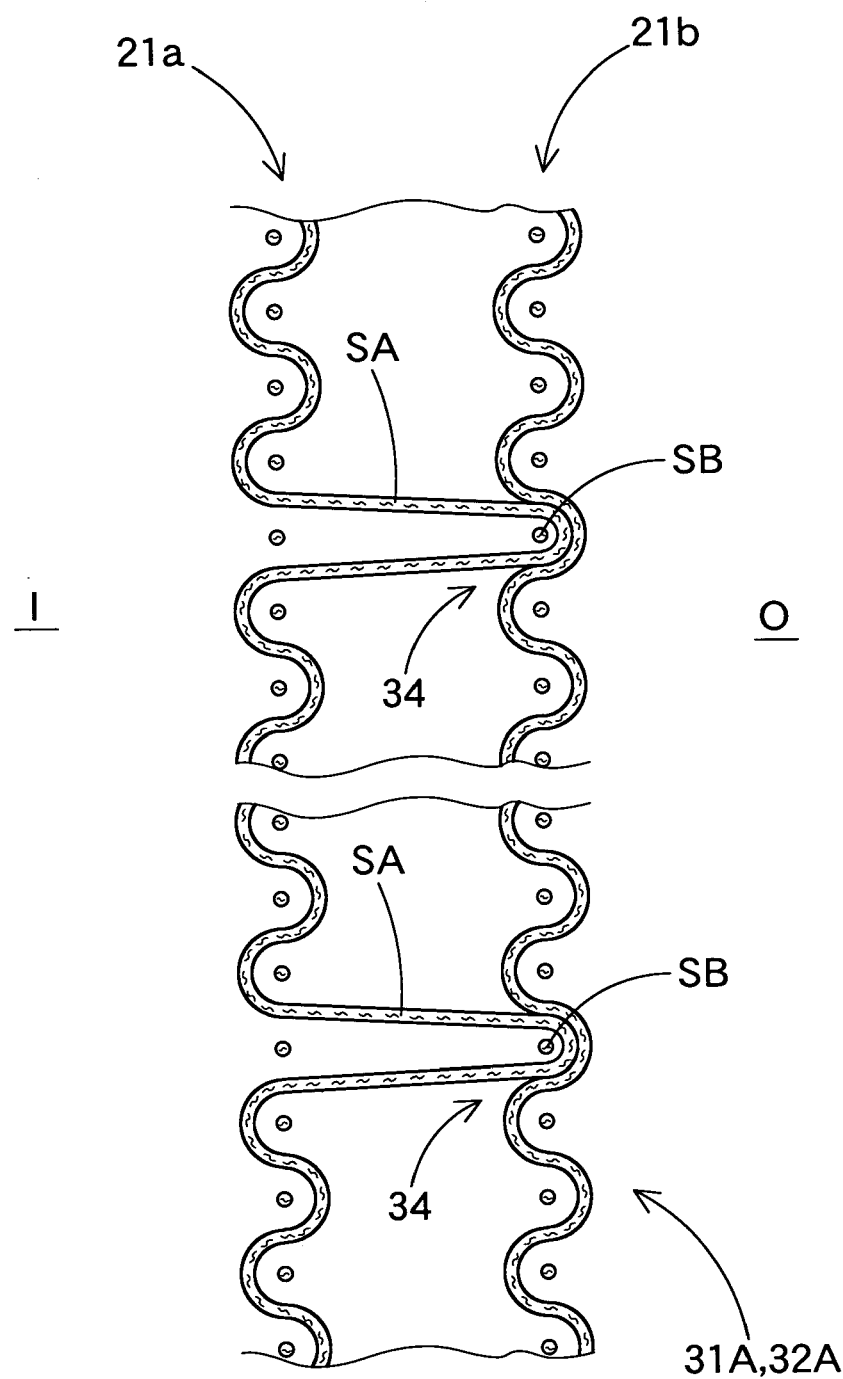
FIG. 17 is a schematic enlarged view of a connection portion of the airbag in FIG. 12.

In an airbag 20E shown in FIG. 16 having inverted-L shaped temporary joints 31E and 32E, it will be appreciated to locate more than one temporary joints 31E or 32E in each of contactable portions 27E, so that the contactable portions 27E inflate thick after the inner wall 21*a* and outer wall 21*b* in the temporary joints 31E and 32E are separated.

In each of the airbags 20, 20B, 20C, 20D and 20E, moreover, the temporary joints 31 or the like are formed by merely stitching up the inner wall 21*a* and 21*b*, and therefore, the temporary joints 31 or the like are formed easily.

On the other hand, in the airbag 20A shown in FIG. 12, the temporary joints 31A and 32A are formed, when the airbag 20A is manufactured by hollow-weaving method, by weaving warps or wefts SA of either one of the inner wall 21*a* or outer wall 21*b* into wefts or warps SB of the other wall, not by stitching up the inner and outer walls. Thus the temporary joints 31A and 32A are formed simply and easily utilizing the warps and wefts SA and SB. A portion where the warps or wefts SA are woven into the wefts or warps SB is called a connection portion 34 herein below.

Of course, there is an alternative to form temporary joints 31F by detachably adhering the inner and outer walls 21*a* and 21*b* by adhesion BC, as in an airbag 20F shown in FIG. 18.

Figure 19:
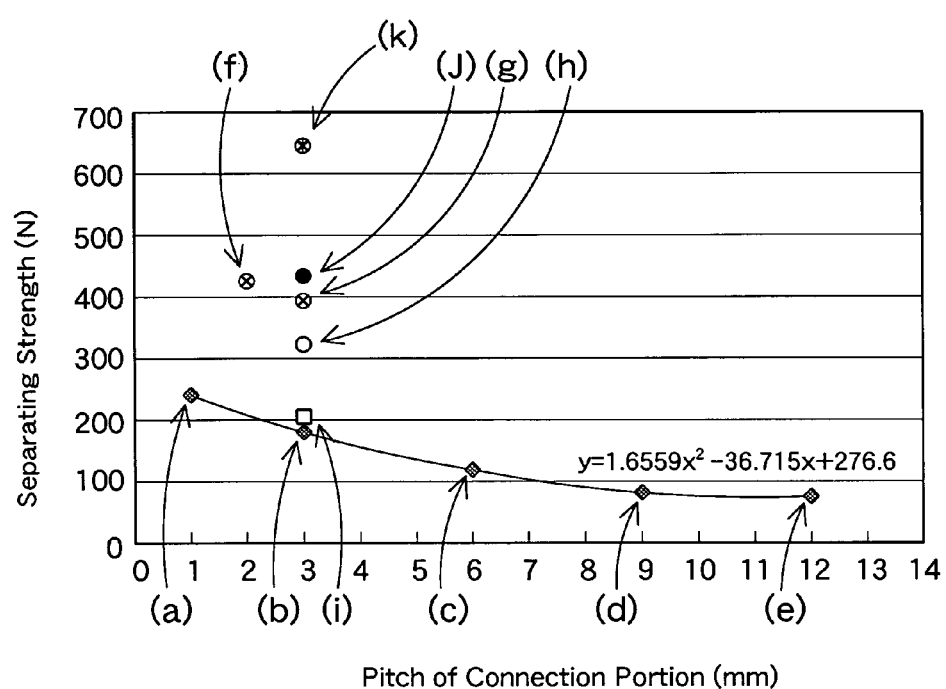
FIG. 19 is a graph showing measurement results of separating strengths of airbags formed by hollow-weaving method.

Table 1 and FIG. 19 show measurement results of separating strengths of the connection portions 34 with variations of pitch of the connection portions 34, number of (rows of) yarns SA woven into the other side, and number of yarns SB weaving yarns SA thereinto.

TABLE 1

| | Separating Strength (N) 1/1-1 mm~12 mm | | | | | | | | | |
|---|---|---|---|---|---|---|---|---|---|---|
| | 1/1-1 mm 1 | 1/1-3 mm 3 | 1/1-6 mm 6 | 1/1-9 mm 9 | 1/1-12 m 12 | 2/2-1 mm 1 | 2/2-2 mm 2 | 2/2-3 mm 3 | 3/3-1 mm 1 | 3/3-3 mm 3 |
| 1 row | (a)243 | (b)178.3 | (c)118 | (d)80 | (e)74.3 | | (f)427 | (g)396.3 | | (h)326.7 |
| 2 row-2 mm | | 169.3 | | | | | | | | |
| 2 row-4 mm | | 183.3 | | | | | | 424 | | (j) 436 |
| 3 row-2 mm | | 184 | | | | | | | | |
| 3 row-4 mm | | (i)207.7 | | | | | | 485.3 | | (k) 640 |

The measurement is performed as follows: Firstly, a portion of hollow-weaved walls 21*a* and 21*b* in which a straight temporary joint constituted by a predetermined connection portion is formed is extracted as a sample. Then edges of the sample walls 21*a* and 21*b* in an extension of the temporary joint are held and pulled in a direction perpendicular to the walls 21*a* and 21*b* to separate the walls 21*a* and 21*b*. Then a pulling load of a time the walls 21*a* and 21*b* in the connection portion 34 are separated is measured, and the load is recorded as a separating strength of the connection portion.

Numerical values after numbers of rows in a left column in Table 1 represent distances between rows. For example, "2 rows-2 mm" means that two yarns (two rows of yarns) SA are used to form a connection portion 34, and that a distance between the yarns SA is 2 mm. "1/1" in a top line means that one yarn SA is woven into one yarn SB to form a connection portion 34, and "2/2" means that two yarns SA are woven into two yarns SB to form a connection portion 34. Moreover, "3/3" means that three yarns SA are woven into three yarns SB to form a connection portion 34. Numerical values thereafter represent pitches of the connection portions 34 along the yarns SA.

A breaking strength of the yarns SA and SB is predetermined to be 20 to 50 N/yarn.

Data shown in (a) to (k) in Table 1 are graphed in FIG. 19.

The data teach that even a temporary joint of a connection portion 34 of 1/1 at pitch of 12 mm has a separating strength of 74.3N, which is over 50N. This means that the temporary joint is not easily separated even under certain influences of inflation gas such as heat. On the other hand, a temporary joint formed of three rows of connection portions 34 at 4 mm intervals each of which is of 3/3 at pitch of 3 mm has a separating strength of 640N, which is over 550N. This suggests that this temporary joint might delay separation of inner and outer walls and further delay inflation of the airbag, and therefore, is not desirable.

The data also teach that, when a temporary joint is formed by one row of connection portion 34 of 1/1 at predetermined pitch, provided that a separating strength is Y (N) and a pitch is X (mm), and that Y should be 50≧Y≧550N, a formula $Y=1.6559X^2+36.715X+276.6$ evaluates a value of X. By forming a connection portion utilizing an evaluated value X, a temporary joint is easily formed.

Moreover, when the separating strength within a range of 150 to 550N is desired, temporary joints of connection portions 34 of 1/1 at pitches of 6 mm, 9 mm and 12 mm have separating strengths below 150N, since pitches of the connection portions 34 are too great. As described above, on the other hand, a temporary joint of three rows of connection portions 34 at 4 mm intervals each of which is of 3/3 at pitch of 3 mm has a separating strength of 640N, which is over 550N. Accordingly, in a temporary joint constituted by connection portions formed in hollow-weaving, a pitch of the connection portion is desirably within a range of 1-4 mm when three or less yarns are woven into the other wall, and when three yarns are woven into the other side, a limit is two rows, and when one yarn is woven into the other side, even three rows work out.

What is claimed is:

1. A head-protecting airbag folded and housed in the upper edge of a side window and deployable downward upon inflow of inflation gas, the airbag comprising:
    an inflatable protective portion to be located at a side of an occupant's head; a vehicle's inner wall and a vehicle's outer wall respectively located in the inner side and outer side of the protective portion, the walls admitting inflation gas therebetween; and
    a temporary joint located in the protective portion, the joint joining the inner wall and the outer wall together, and separating the inner wall and the outer wall when an inner pressure of the protective portion rises after the protective portion completes development, wherein the temporary joint includes a substantially vertical portion; and separation of the temporary joint proceeds from a lower end thereof to an upper end thereof.

2. The head-protecting airbag according to claim 1, wherein:
    the temporary joint is located in a portion contactable with the occupant's head in the protective portion; and
    the airing is further provided at least either in front or rearward of the contactable portion with a vertical gas passage for inflation gas to flow downward therethrough, the passage helping develop the contactable portion completely before the inner and outer walls in the temporary joint start separating in an initial stage of inflow of inflation gas.

3. The head-protecting airbag according to claim 2, wherein inflatable portions located in front and rearwards of the temporary joint have thicknesses of 30 to 75 mm right before the inner and outer walls in the temporary joint start separating.

4. The head-protecting airbag according to claim 2, further comprising a non-admissive portion joining the inner and outer walls undetachably and admitting no inflation gas; wherein:
    the non-admissive portion includes a partitioning portion for partitioning the protective portion; and
    the partitioning portion includes a cover portion located upstream of an upper end of the temporary joint in a path of the inflation gas, such that the cover portion protects the upper end part of the temporary joint from inflation gas.

5. The head-protecting airbag according to claim 1, wherein a strength to separate the vehicle's inner wall and outer wall in the temporary joint is predetermined within a range of 50 to 550N.

6. The head-protecting airbag according to claim 1, further comprising a non-admissive portion joining the inner and outer walls undetachably and admitting no inflation gas; wherein the temporary joint is either proximate, or joined at an upper end thereof to the non-admissive portion such that stress concentration is less likely to occur in the upper end of the temporary joint than in a lower end of the temporary joint.

7. The head-protecting airbag according to claim 6, further comprising a gas feed passage arranged along an upper edge of the airbag in the front-rear direction, the passage being upstream of the protective portion in a path of the inflation gas, wherein a portion of the protective portion, which neighbors the temporary joint in the front-rear direction and is located opposite from a position where the temporary joint is proximate to or joined to the non-admissive portion, is communicated at an upper part thereof with the gas feed passage.

8. The head-protecting airbag according to claim 6, wherein:
    the non-admissive portion includes a partitioning portion arranged substantially vertically for partitioning the protective portion; and
    the temporary joint is curved toward an upstream direction of the inflation gas to become parallel with a stream of inflation gas in the upper end thereof, and the upper end is proximate to or joined to an upper end of the partitioning portion.

9. The head-protecting airbag according to claim 8, wherein:
    inflation gas flows in the front-rear direction in the vicinity of the upper end of the partitioning portion; and
    a horizontal portion of the temporary joint is arranged in a lower level than the upper end of the partitioning portion, whereby inflation gas is prevented from abutting against the horizontal portion directly.

10. The head-protecting airbag according to claim 6, wherein:

the non-admissive portion includes a partitioning portion for partitioning the protective portion, the partitioning portion encircling the temporary joint from front, rear and upper sides in an inverted U shape; and the upper end of the temporary joint is proximate to or joined to an upper horizontal portion of the inverted U-shaped partitioning portion.

11. The head-protecting airbag according to claim 6, wherein:

the non-admissive portion includes partitioning portions for partitioning the protective portion, the partitioning portions being arranged vertically in front and rearwards of the temporary joint; and the temporary joint is provided in an upper end thereof with a horizontal portion to be proximate to or joined to upper ends of the partitioning portions.

12. The head-protecting airbag according to claim 1, wherein the temporary joint is formed by a breakable yarn joining the vehicle's inner wall and outer wall.

13. The head-protecting airbag according to claim 12, wherein the breakable yarn is constituted by a stitching yarn stitching up the vehicle's inner wall and outer wall.

14. The head-protecting airbag according to claim 12, wherein:

the airbag is formed by hollow-weaving method; and the breakable yarn is constituted by a warp or a weft of at least either of the vehicle's inner wall or outer wall, the warp or weft being woven into the other side wall.

15. The head-protecting airbag according to claim 1, wherein the temporary joint is formed by adhesive adhering the vehicle's inner wall and outer wall detachably.

16. The head-protecting airbag according to claim 1, wherein an upper edge of the airbag includes mounting holes, which are adapted to fix the airbag to an inner panel of a vehicle in the upper edge of the side window.

17. The head-protecting airbag according to claim 1, wherein the airbag includes mounting portions that project from an upper peripheral part of the airbag, wherein the mounting portions are adapted to be fixed to a vehicle in the upper edge of the side window.

* * * * *